US012704798B2

(12) United States Patent
Sakamoto et al.

(10) Patent No.: US 12,704,798 B2
(45) Date of Patent: Aug. 11, 2026

(54) BOOKBINDING APPARATUS THAT CREATES BOOK BY BONDING A PLURALITY OF SHEETS USING TONER

(71) Applicant: CANON KABUSHIKI KAISHA, Tokyo (JP)

(72) Inventors: Tatsuyoshi Sakamoto, Shizuoka (JP); Takaomi Uezono, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 18/664,415

(22) Filed: May 15, 2024

(65) Prior Publication Data

US 2024/0393711 A1 Nov. 28, 2024

(30) Foreign Application Priority Data

May 22, 2023 (JP) ................................ 2023-084159

(51) Int. Cl.

*G03G 15/00* (2006.01)
*B42C 1/12* (2006.01)
*G03G 15/041* (2006.01)

(52) U.S. Cl.

CPC .......... *G03G 15/0415* (2013.01); *B42C 1/12* (2013.01); *G03G 15/6541* (2013.01); *G03G 15/6544* (2013.01); *G03G 2215/00835* (2013.01); *G03G 2215/00936* (2013.01); *G03G 2215/0487* (2013.01)

(58) Field of Classification Search

CPC ......... G03G 15/0415; G03G 15/04072; G03G 15/043; G03G 15/6541; G03G 15/6544; G03G 2215/00835; G03G 2215/00936; G03G 2215/0404; G03G 2215/0487; B41J 2/442; B41J 2/445; B41J 2/471; B41J 2/473; B42C 1/12; B42C 9/0081; B42C 9/0093; G06K 15/403; G06K 15/404;

(Continued)

(56) References Cited

U.S. PATENT DOCUMENTS 6,980,767 B1 * 12/2005 Cahill ................ G03G 15/6544 399/407
8,548,371 B2 * 10/2013 Kwarta ............. G03G 15/6544 400/24

(Continued)

FOREIGN PATENT DOCUMENTS

JP 2004209859 A * 7/2004 .......... B42C 9/0081
JP 2005007637 A * 1/2005

(Continued)

*Primary Examiner* — Robert B Beatty
(74) *Attorney, Agent, or Firm* — ROSSI, KIMMS & McDOWELL LLP

(57) ABSTRACT

A light source includes a light emitting element, and an optical system that directs light output from the light emitting element to a surface of a photosensitive member. An irradiation amount of light for forming a second electrostatic latent image is larger than an irradiation amount of light for forming a first electrostatic latent image. A position at which a propagation efficiency of light peaks in a scanning direction of the light is located between a center of an image height of the optical system and a surface area in which the second electrostatic latent image is formed out of the surface of the photosensitive member.

12 Claims, 14 Drawing Sheets

(58) Field of Classification Search
CPC ........... G06K 15/1204; G06K 15/1209; G06K 15/1238; G06K 15/1257
USPC ........................................................ 399/409
See application file for complete search history.

(56) References Cited

U.S. PATENT DOCUMENTS

| | | | | |
|---|---|---|---|---|
| 2012/0155944 | A1* | 6/2012 | Matsue | G03G 15/6541 399/408 |
| 2013/0051886 | A1* | 2/2013 | Watanabe | G03G 15/6544 399/409 |
| 2014/0227064 | A1* | 8/2014 | Matsue | B42C 13/003 412/37 |
| 2015/0362880 | A1* | 12/2015 | Abe | G03G 15/6541 399/408 |
| 2017/0255154 | A1* | 9/2017 | Abe | G03G 15/6538 |

FOREIGN PATENT DOCUMENTS

| | | | |
|---|---|---|---|
| JP | 2005162352 | A | 6/2005 |
| JP | 2015028592 | A | 2/2015 |

* cited by examiner

FIG. 2A
FIG. 2B
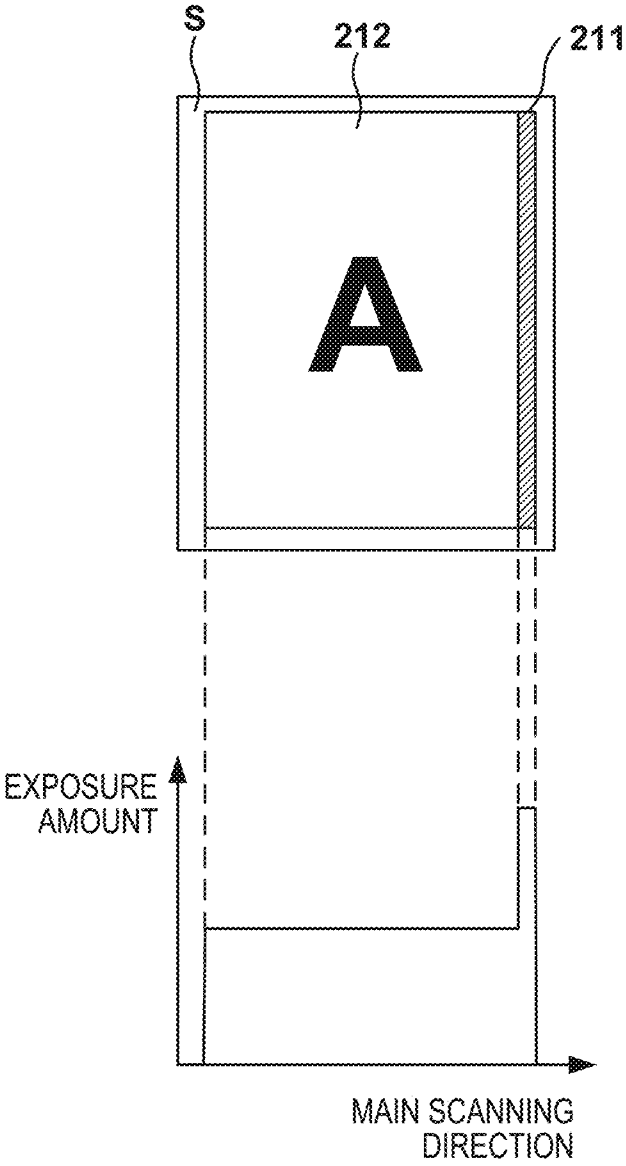
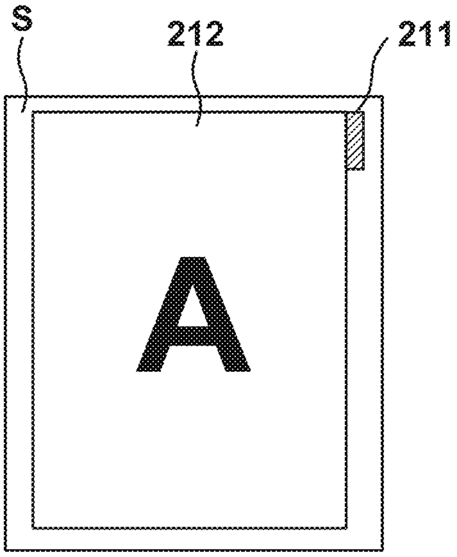
FIG. 2C

BOOKBINDING APPARATUS THAT CREATES BOOK BY BONDING A PLURALITY OF SHEETS USING TONER

BACKGROUND OF THE INVENTION

Field of the Invention

The present disclosure relates to a bookbinding apparatus that creates a book by bonding a plurality of sheets using toner.

Description of the Related Art

A bookbinding apparatus creates a book by stacking and bonding a plurality of sheets on which images have been formed through an electrophotographic process. It is described in Japanese Patent Laid-Open No. 2005-162352 that toner is used as an adhesive in bonding a plurality of sheets.

In order to improve the toner's bonding performance between a plurality of sheets, it is sufficient to increase the amount of toner that is transferred to an adhesive area. The amount of toner applied to an adhesive area depends on the intensity of a laser beam with which a photosensitive member is irradiated. The photosensitive member is irradiated with the laser beam via an optical system. Therefore, depending on the propagation efficiency of the optical system, an exposure area on the photosensitive member, which is equivalent to an adhesive area on a sheet, may not be irradiated with a sufficient amount of laser beam. In this case, a sufficient adhesive force may not be achieved in the adhesive area.

SUMMARY OF THE INVENTION

The present disclosure may provide a bookbinding apparatus comprising: a photosensitive member; a light source that forms a first electrostatic latent image corresponding to an original area and a second electrostatic latent image corresponding to an adhesive area by irradiating the photosensitive member with light; a developing member that forms a first toner image and a second toner image by developing the first electrostatic latent image and the second electrostatic latent image using toner; a transferring member that transfers the first toner image and the second toner image formed by the developing member to a sheet; a fixing unit that fixes the first toner image and the second toner image on the sheet; and a bonding unit that creates a book by bonding a plurality of sheets on which the first toner image and the second toner image have been formed with use of the second toner image, wherein an irradiation amount of the light for forming the second electrostatic latent image is larger than an irradiation amount of the light for forming the first electrostatic latent image, the light source includes a light emitting element, and an optical system that directs light output from the light emitting element to a surface of the photosensitive member, and a position at which a propagation efficiency of the light peaks in a scanning direction of the light that is parallel to a rotation axis of the photosensitive member is located between a center of an image height of the optical system and a surface area in which the second electrostatic latent image is formed out of the surface of the photosensitive member, the propagation efficiency taking place between the light emitting element and the surface of the photosensitive member.

Further features of the present disclosure will become apparent from the following description of exemplary embodiments (with reference to the attached drawings).

BRIEF DESCRIPTION OF THE DRAWINGS

FIGS. 2A to 2C are diagrams illustrating a document area and an adhesive area on a sheet.

DESCRIPTION OF THE EMBODIMENTS

Figure 1:
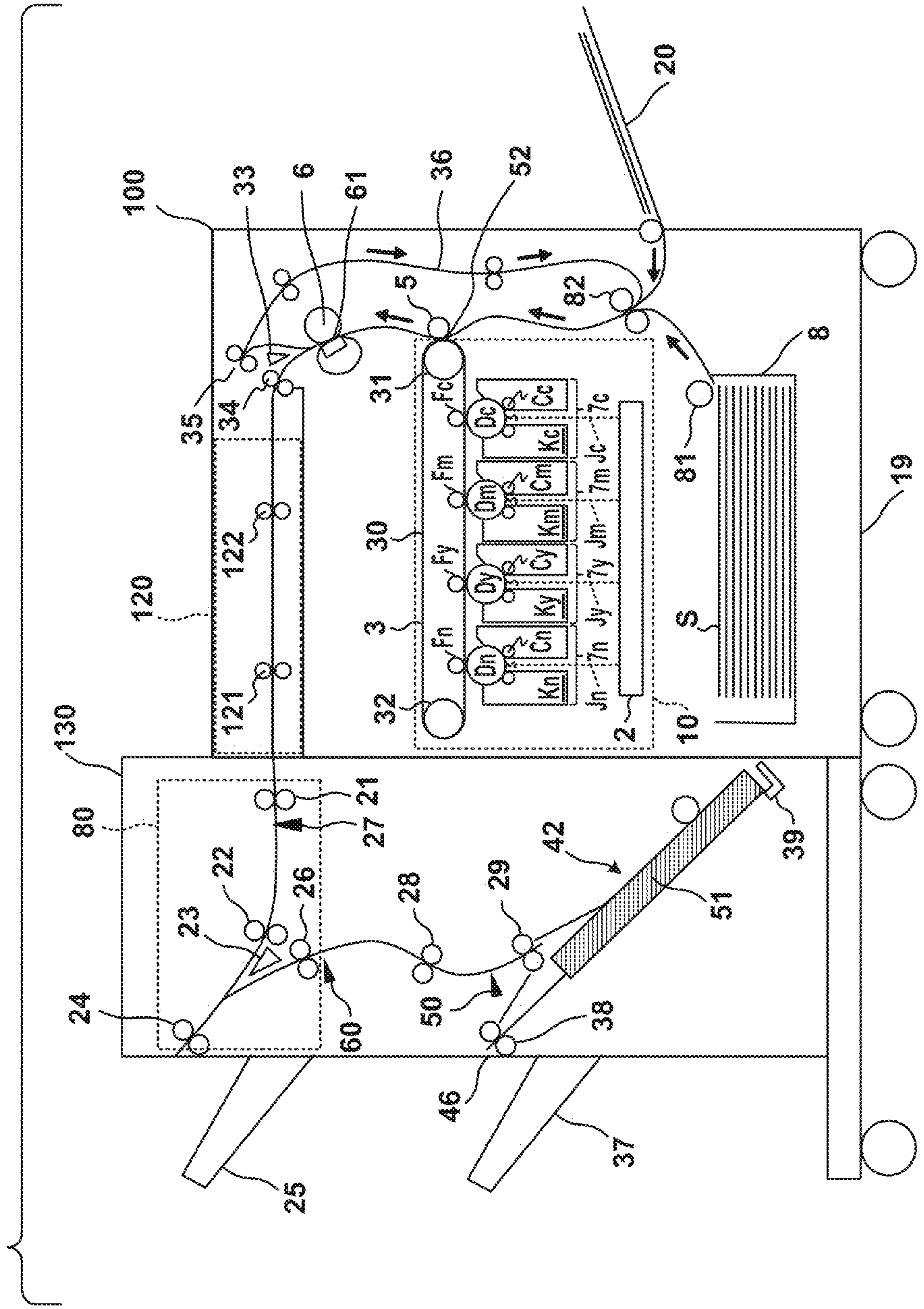
FIG. 1 is a diagram illustrating a bookbinding apparatus (an image forming apparatus).

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(1) Image Forming System

As shown in FIG. 1, an image forming system 1 includes an image forming apparatus 100 and a post-processing apparatus 130. The post-processing apparatus 130 is a sheet processing apparatus connected to the image forming apparatus 100. The image forming apparatus 100 forms an image on a sheet S, which is a recording material. An intermediate conveyance unit 120 conveys the sheet S on which the image has been formed to the post-processing apparatus 130. The post-processing apparatus 130 applies post-processing to the sheet S as necessary, and outputs the sheet S.

The image forming apparatus 100 includes a sheet cassette 8, an image forming unit 10, a fixing device 6, and a housing 19 that houses these. The image forming unit 10 forms toner images on a sheet S fed from the sheet cassette 8. The fixing device 6 executes fixing processing for fixing the toner images on the sheet S.

The sheet cassette 8 is located in a lower part of the image forming apparatus 100. The sheet cassette 8 is inserted in the housing 19 in a drawable manner, and is also capable of storing a large number of sheets S. A feeding roller 81 feeds a sheet S from the sheet cassette 8, and passes the sheet S to a conveyance roller pair 82. A multi-tray 20 is also capable of feeding the sheets S one by one.

The image forming unit 10 is a tandem-type electrophotographic unit that includes four process cartridges 7*n*, 7*y*, 7*m*, and 7*c*, an exposure apparatus 2, and a transferring unit 3. y, m, and c denote yellow, magenta, and cyan, respectively. n denotes black. The process cartridges 7*n*, 7*y*, 7*m*, and 7*c* allow a plurality of components that take a role in an image forming process to be integrally exchanged. That is to say, the process cartridges 7*n*, 7*y*, 7*m*, and 7*c* are formed by the integral set of the plurality of components.

The process cartridges 7*n*, 7*y*, 7*m*, and 7*c* respectively include corresponding developing apparatuses Kn, Ky, Km, and Kc, photosensitive drums Dn, Dy, Dm, and Dc, and charging rollers Cn, Cy, Cm, and Cc. The structures of the process cartridges 7*n*, 7*y*, 7*m*, and 7*c* are substantially the same, except for the types of toner.

The developing apparatuses Ky, Km, and Kc house toner in yellow, magenta, and cyan for forming visible images on a sheet S. The developing apparatus Kn houses black toner Tn. The black toner Tn is used to form a user image (a document image), and also to perform thermocompression bonding of a plurality of sheets S in the post-processing apparatus 130. Note that as a result of the development using the black toner Tn, a black toner image is formed on the photosensitive drum Dn.

The image forming unit 10 may include a fifth process cartridge that uses toner dedicated for bonding. Note that the types and the number of items of printing toner can be changed in accordance with an intended use of the image forming apparatus 100.

The charging rollers Cn, Cy, Cm, and Cc are chargers, and uniformly charge the surfaces of corresponding photosensitive drums Dn, Dy, Dm, and Dc, respectively. The exposure apparatus 2 is located below the process cartridges 7*n*, 7*y*, 7*m*, and 7*c*, and above the sheet cassette 8. The exposure apparatus 2 forms electrostatic latent images by irradiating the photosensitive drums Dn, Dy, Dm, and Dc with corresponding laser beams Jn, Jy, Jm, and Jc, respectively. The exposure apparatus 2 may be referred to as an optical scanning apparatus.

The developing apparatuses Kn, Ky, Km, and Kc form toner images by attaching toner to the electrostatic latent images on the photosensitive drums Dn, Dy, Dm, and Dc. The developing apparatuses Kn, Ky, Km, and Kc may be referred to as developing members (e.g., developing sleeves or developing rollers).

The transferring unit 3 includes a transferring belt 30 as an intermediate transferring member (a secondary image carrier). The transferring belt 30 is an endless belt that is wound around an inner roller 31 and a stretching roller 32. An outer circumferential surface (an image forming surface) of the transferring belt 30 opposes the photosensitive drums Dn, Dy, Dm, and Dc. Primary transferring rollers Fn, Fy, Fm, and Fc are arranged on an inner circumferential side of the transferring belt 30 so as to oppose the photosensitive drums Dn, Dy, Dm, and Dc. The primary transferring rollers Fn, Fy, Fm, and Fc may be transferring blades.

The primary transferring rollers Fn, Fy, Fm, and Fc transfer the toner images respectively from corresponding photosensitive drums Dn, Dy, Dm, and Dc to the transferring belt 30. The primary transferring rollers Fn, Fy, Fm, and Fc may be referred to as primary transferring devices. The transferring belt 30 rotates counterclockwise; as a result, the toner images are conveyed to a secondary transferring unit.

A secondary transferring roller 5 is placed so as to oppose the inner roller 31, and a transferring nip 52 is formed between the secondary transferring roller 5 and the transferring belt 30. The transferring nip 52 transfers the toner images from the transferring belt 30 to a sheet S. The transferring nip 52 may be referred to as a secondary transferring unit.

The fixing device 6 is placed above (downstream, in the conveyance direction of the sheet S, relative to) the secondary transferring roller 5. The fixing device 6 applies heat and pressure to the sheet S that passes through a fixing nip 61. As a result, the toner images are fixed on the sheet S. The fixing device 6 may include two rotary bodies (e.g., a tubular heating film that is heated by a heater, and a pressurizing roller that causes the heating film to rotate by coming into contact with the heating film).

FIG. 2A shows an image area 212 in which a user image (document image) is formed, and an adhesive area 211 in which a toner image is formed by the adhesive toner Tn. In this example, the adhesive area 211 extends parallel to a long edge of a sheet S. The adhesive area 211 is located in an edge portion close to the long edge. As a result, once the post-processing apparatus 130 has stacked a plurality of sheets S and applied heat and pressure to the adhesive areas 211 of the plurality of sheets S, the plurality of sheets S are bonded, thereby forming a book. The book in this case is a book that has been bound at the long edge. Here, an adhesive toner image (the adhesive area 211) has a width (a length in the short-edge direction) of 4.0 mm, for example.

As shown in FIG. 2B, a small adhesive area 211 for the adhesive toner Tn may be formed in the vicinity of a corner of the sheet S. In this way, a book that has been bound at the corner is created. An image of the adhesive toner Tn is not formed on a sheet S that will be a cover of the book.

FIG. 2C shows an exposure amount applied to the adhesive area 211 and an exposure amount applied to the image area 212. A vertical axis represents an exposure amount. A horizontal axis represents a main scanning direction. Here, the main scanning direction is a direction parallel to the rotation axes of the photosensitive drums D. FIG. 2C is under the assumption that a solid image of a uniform density is formed in the image area 212. The exposure amount applied to the adhesive area 211 is larger than the exposure amount applied to the image area 212. In this way, the amount of toner used in bonding the plurality of sheets S can be increased.

The description of FIG. 1 is now resumed. As shown in FIG. 1, a switching guide 33 is a flap-like guiding member that is located downstream relative to the fixing device 6 in the conveyance direction of the sheet S. When a single-sided printing mode for forming images on one side of the sheet S has been selected, the switching guide 33 directs the sheet S to a discharge roller 34. When a double-sided printing mode for forming images on both sides of the sheet S has been selected, the switching guide 33 directs the sheet S, which has images formed on a first side thereof, to a switch-back roller pair 35. The switch-back roller pair 35 conveys the sheet S in a first direction. When the sheet S is placed in a state where a trailing edge thereof can enter a double-side conveyance path 36, the switch-back roller pair 35 starts to rotate in reverse. As a result, the sheet S is conveyed to the double-side conveyance path 36. The double-side conveyance path 36 causes the sheet S to be conveyed to the secondary transferring unit again. In this way, images are formed on a second side of the sheet S.

The discharge roller 34 conveys the sheet S to the intermediate conveyance unit 120. The intermediate conveyance unit 120 includes conveyance roller pairs 121 and 122. The conveyance roller pairs 121 and 122 convey the sheet S to the post-processing apparatus 130.

(2) Post-Processing Apparatus

The post-processing apparatus 130 is a floor-standing sheet processing apparatus. The post-processing apparatus 130 has a function of buffering a plurality of sheets, a function of aligning the plurality of sheets, and a function of bonding a stack of sheets.

Hereinafter, a front edge of a sheet S in the conveyance direction will be referred to as a leading edge. A rear edge of the sheet S in the conveyance direction will be referred to as a trailing edge. Out of the two edges of the sheet S, the edge that enters the post-processing apparatus 130 first will be referred to as a first edge. Out of the two edges of the sheet S, the edge that enters the post-processing apparatus 130 later will be referred to as a second edge. Note that, due to the switch-back conveyance performed by the post-processing apparatus 130, the leading edge may be changed from the first edge to the second edge, and the trailing edge may be changed from the second edge to the first edge.

The sheet S that has been conveyed from the intermediate conveyance unit 120 is passed to an entrance roller 21 in the post-processing apparatus 130. A sheet sensor called a sheet sensor 27 is located downstream relative to the entrance roller 21. When the sheet sensor 27 has detected the trailing edge of the sheet S, a conveyance roller pair 22 accelerates the sheet S. When the trailing edge of the sheet S for which an upper tray 25 is set as a discharge destination has arrived between the conveyance roller pair 22 and a conveyance roller pair 24, the conveyance roller pair 22 decelerates. As a result, the conveyance speed of the sheet S becomes a predetermined discharge speed. The conveyance roller pair 22 discharges the sheet S to the upper tray 25.

When the trailing edge of the sheet for which a lower tray 37 is set as a discharge destination has passed through a reverse-flow prevention valve 23, the conveyance roller pair 22 stops the conveyance of the sheet S. Thereafter, the conveyance roller pair 22 starts to rotate in reverse. As a result, the sheet S is switched back and conveyed to a conveyance roller pair 26. When a sheet sensor 60 located downstream relative to the conveyance roller pair 26 has detected the leading edge of the sheet S, the two rollers that compose the conveyance roller pair 24 become separated. In this way, the conveyance roller pair 24 can accept a succeeding sheet S. Furthermore, the conveyance roller pair 26 stops in a state where the conveyance roller pair 26 is holding the preceding sheet S therebetween. The conveyance roller pair 26 starts to rotate in reverse in conformity with the arrival of the succeeding sheet S. In this way, the succeeding sheet S is overlaid on the preceding sheet S. Sheets S are switched back by the conveyance roller pair 26 repeatedly; consequently, a plurality of sheets S are stacked, and a stack of sheets is formed. An operation of forming such a stack of sheets may be referred to as a buffer operation. A unit that realizes the buffer operation is referred to as a buffer unit 80.

Once the stack of sheets has been completed in the buffer unit 80, the conveyance roller pair 26 conveys the stack of sheets toward an intermediate loading unit 42. The stack of sheets passes through a conveyance roller pair 28 and a sheet sensor 50. Furthermore, the stack of sheets is conveyed to the intermediate loading unit 42 by a propelling roller 29. In a section that is located most downstream in the intermediate loading unit 42, a movable vertical alignment plate 39 is disposed at a standby position. The stack of sheets abuts on the vertical alignment plate 39; as a result, the stack of sheets is aligned.

In the intermediate loading unit 42, a plurality of stacks of sheets are loaded in order. In this way, a predetermined number of sheets S that form a book are loaded in the intermediate loading unit 42. Once the alignment of the predetermined number of sheets S has been finished, a thermocompression bonding unit 51 executes a binding operation (thermocompression bonding processing), thereby forming a book. Along with the movement of the vertical alignment plate 39 from the standby position to a discharge position, the book is pushed out toward discharge rollers 38. Once the leading edge of the book has been held between the discharge rollers 38, the vertical alignment plate 39 stops, and then returns to the standby position again. The discharge rollers 38 discharge the book that has been received from the vertical alignment plate 39 to the lower tray 37 via a discharge outlet 46.

In the foregoing description, the post-processing apparatus 130 forms a stack of sheets composed of a plurality of sheets S with use of the buffer unit 80, and conveys the stack of sheets to the intermediate loading unit 42. However, one sheet S may be conveyed to the intermediate loading unit 42.

(3) Exposure Apparatus (Light Source)

(3-1) Structure

Figure 3:
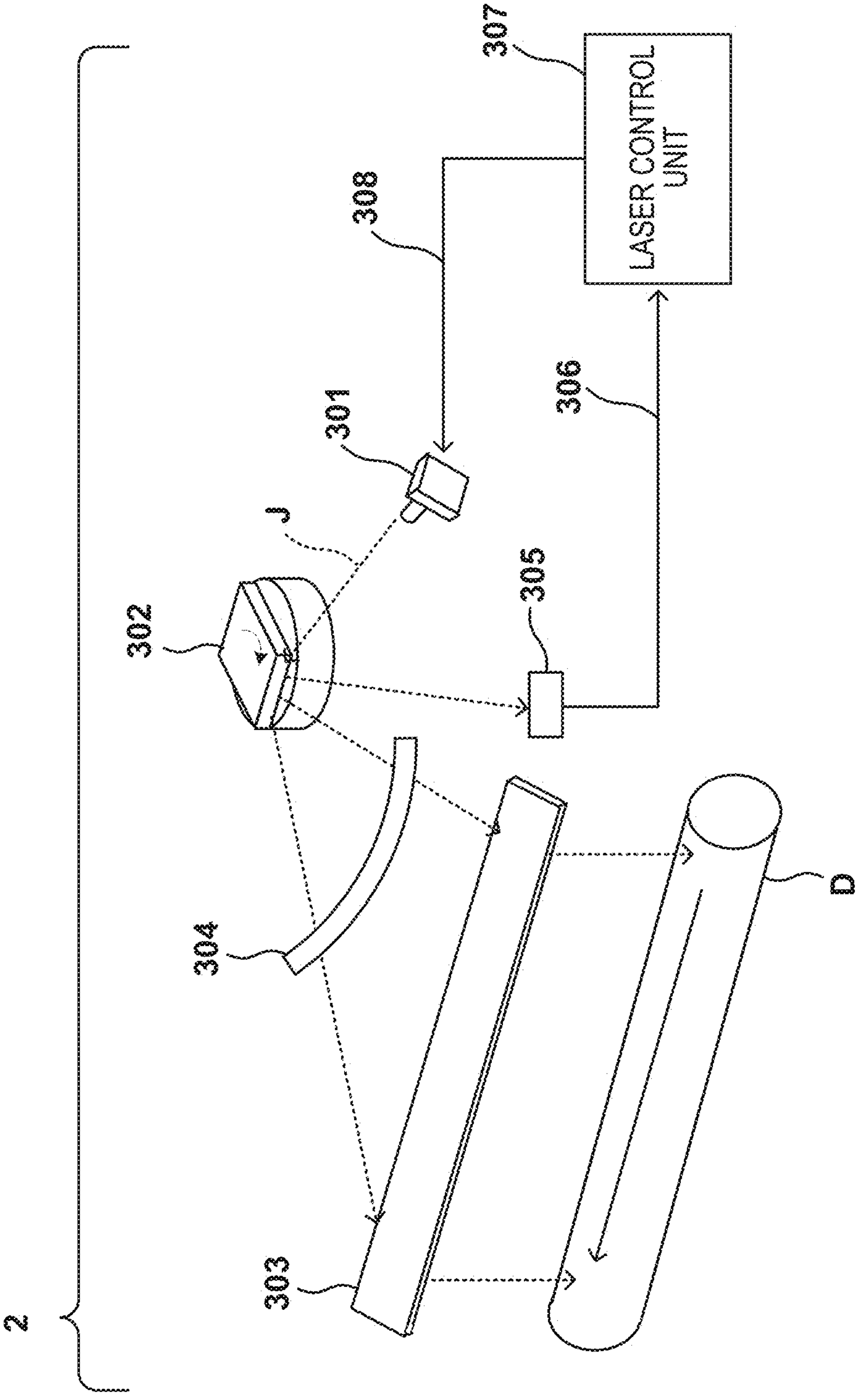
FIG. 3 is a diagram illustrating an exposure apparatus.

Although the exposure apparatus 2 illustrated in FIG. 3 irradiates one photosensitive drum D with a laser beam, this is merely an example. For example, one exposure apparatus 2 may be provided per photosensitive drum D. Alternatively, one exposure apparatus 2 may be provided per pair of photosensitive drums D.

A semiconductor laser 301 is a light source that outputs a laser beam (an optical beam) J. As will be described later, the semiconductor laser 301 may be configured to output a plurality of optical beams. A rotatable polygonal mirror 302 has a plurality of reflective surfaces. Each of the plurality of reflective surfaces realizes one scan. While rotating, the rotatable polygonal mirror 302 reflects the laser beam J from the semiconductor laser 301. The laser beam J is transmitted through a lens 304 (e.g., an fθ lens), and irradiates a surface of the photosensitive drum D via a reflection mirror 303. The lens 304 is a lens that corrects the laser beam J so that the laser beam J moves at an equal speed on the photosensitive drum D. A synchronization sensor 305 detects the laser beam J, and outputs a synchronization signal 306 to a laser control unit 307. Based on the synchronization signal 306, the laser control unit 307 controls a timing at which writing is started with the laser beam J in the main scanning direction, and controls a light amount of the laser beam. Furthermore, the laser control unit 307 generates a driving current 308, and drives the semiconductor laser 301 by supplying the same to the semiconductor laser 301.

(3-2) Laser Control Unit

Figure 4:
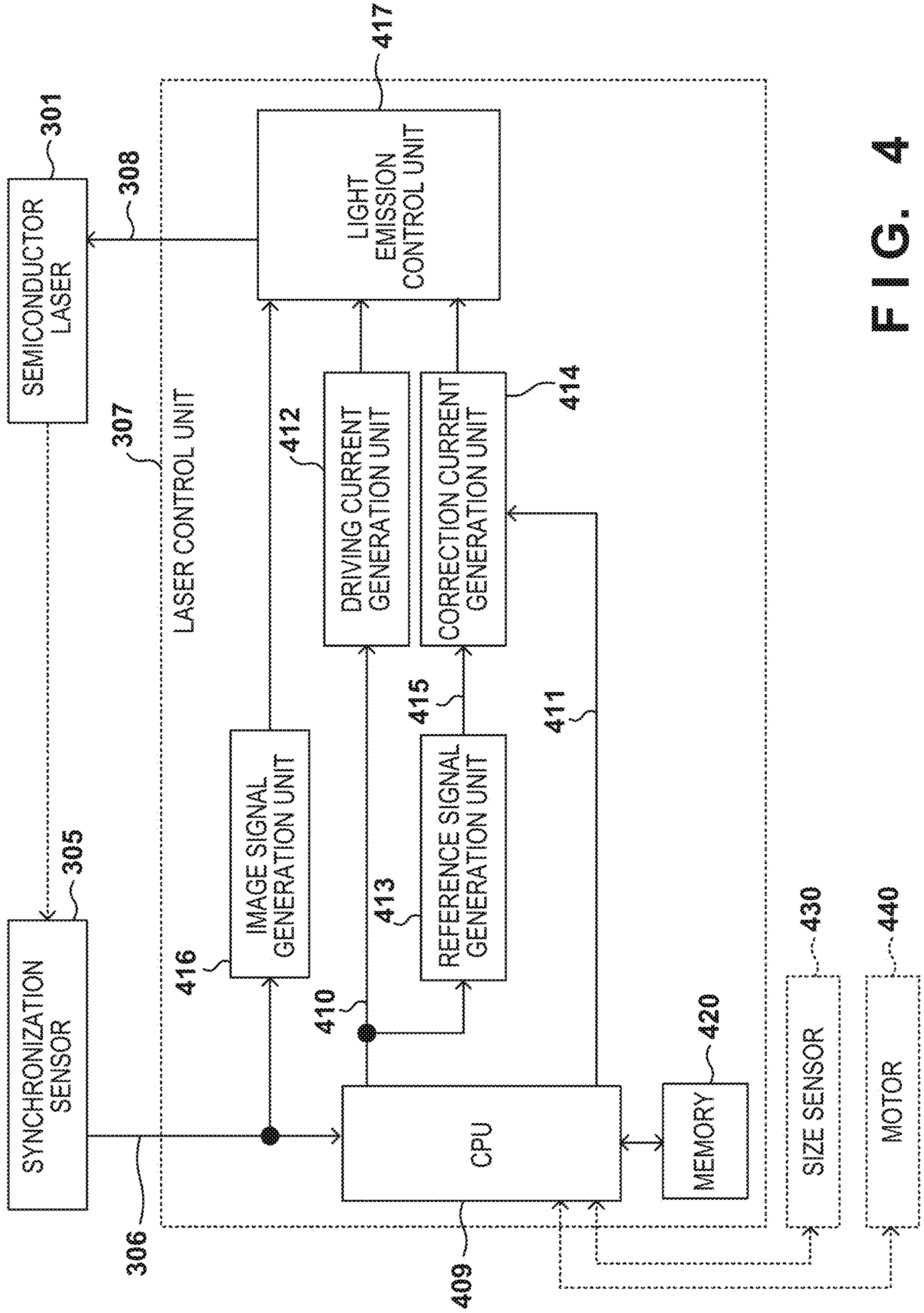
FIG. 4 is a diagram illustrating a laser control unit.

FIG. 4 shows the details of the laser control unit 307. A CPU 409 controls the semiconductor laser 301 in accordance with a control program stored in a memory 420. The memory 420 includes a nonvolatile memory (e.g., a read-only memory (ROM)), a volatile memory (e.g., a random-access memory (RAM)), and the like.

The CPU 409 generates a light amount control signal 410 and generates a light amount correction signal 411 in accordance with a light amount of the semiconductor laser 301. A driving current generation unit 412 generates a driving current corresponding to the light amount control signal 410, and outputs the driving current to a light emission control unit 417.

A reference signal generation unit 413 generates a correction reference signal 415 in accordance with the light amount control signal 410. A correction current generation unit 414 generates a correction current Ic in accordance with the light amount correction signal 411 and the correction reference signal 415.

An image signal generation unit 416 converts image data prepared by a user into a light emission control signal for controlling the semiconductor laser 301. The light emission control unit 417 generates a driving current 308 in accordance with the output from the driving current generation unit 412 and the output from the correction current generation unit 414. Furthermore, the light emission control unit 417 supplies the driving current 308 to the semiconductor laser 301 in synchronization with the output timing of an image signal from the image signal generation unit 416.

A size sensor 430 and a motor 440 may be connected to the CPU 409 as options. The size sensor 430 is a sensor that detects the size of a sheet S. The CPU 409 may determine or adjust the position of the adhesive area 211 on the sheet S in accordance with the size of the sheet S. The motor 440 is a motor that adjusts the rotation angle (inclination θ) of the semiconductor laser 301. For example, the CPU 409 may adjust the inclination θ of the semiconductor laser 301 in accordance with the resolution designated by the user.

(3-3) Driving Current Generation Unit

Figure 5:
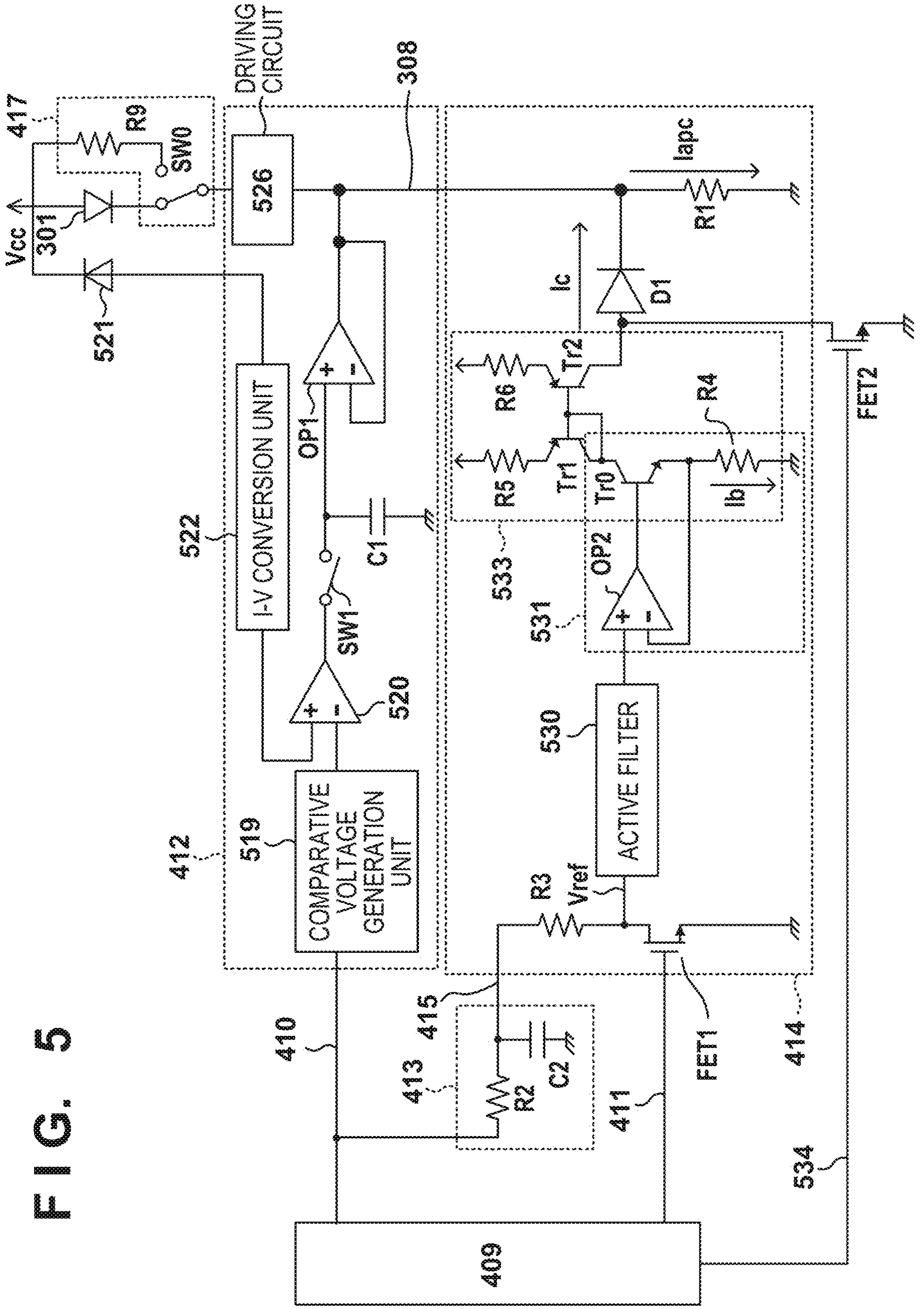
FIG. 5 is a circuit diagram illustrating the laser control unit.

FIG. 5 is a circuit diagram showing a part of the laser control unit 307 that is mainly related to a laser driving circuit. The light emission control unit 417 is composed of a resistor R9 that is connected in parallel to the semiconductor laser 301, and a switch SW0. A driving circuit 526 switches the destination of the supply of the driving current 308 between the semiconductor laser 301 and the resistor R9.

The light amount of the laser beam J output from the semiconductor laser 301 is controlled to be a certain target light amount in a state where an image signal has not been supplied. The semiconductor laser 301 is temperature-dependent. Therefore, the driving current 308 with which the target light amount can be achieved changes with a temperature increase of the semiconductor laser 301. For this reason, the laser control unit 307 maintains the light amount of the laser beam J at the target light amount by adjusting the driving current 308 through the execution of automatic light amount control (APC).

The light amount control signal 410 is, for example, a high-active PWM signal. PWM is an acronym for pulse-width modulation. The CPU 409 reads out the target light amount of the semiconductor laser 301 from the memory 420. The CPU 409 determines a duty cycle corresponding to the target light amount, and outputs a PWM signal with the determined duty cycle (the light amount control signal 410).

The PWM signal is input to a comparative voltage generation unit 519. The comparative voltage generation unit 519 is a conversion circuit that converts the PWM signal into a direct-current voltage, and inputs the direct-current voltage to a negative terminal of a comparator 520. This direct-current voltage is a voltage corresponding to the target light amount (a voltage for comparison or a target voltage).

A photodiode 521 is a light receiving element that receives the laser beam J from the semiconductor laser 301 and generates a detection current corresponding to the laser beam J. A cathode of the photodiode 521 is connected to a reference voltage source Vcc. An anode of the photodiode 521 is connected to an I-V conversion unit 522.

The I-V conversion unit 522 is a conversion circuit that converts the detection current into a detection voltage. The detection voltage is input to a positive terminal of the comparator 520. During the execution of the APC, the CPU 409 maintains a switch SW1 in an ON state. The comparator 520 compares the detection voltage with the target voltage, and generates an output result corresponding to the comparison result. A capacitor C1 is charged and discharged accordingly. Note that the switch SW1 and the capacitor C1 together form a sample and hold circuit. The voltage held by the capacitor C1 is input to a voltage follower (a buffer circuit) composed of an operational amplifier OP1. The voltage follower operates so that the voltage of an output terminal of the operational amplifier OP1 becomes equal to the voltage of the capacitor C1. The driving circuit 526 controls the driving current 308 that flows in the semiconductor laser 301 and a resistor R1. Charging and discharging of the capacitor C1 are repeated until the light amount of the semiconductor laser 301 reaches the target light amount. Once the light amount of the semiconductor laser 301 has reached the target light amount, the charging voltage of the capacitor C1 converges on a certain value. As a result, the driving current 308 converges on Iapc.

(3-4) Correction Current Generation Unit

The light amount correction signal 411 output from the CPU 409 is input to a gate of an FET1. A drain of the FET1 is connected to an active filter 530. The drain is further connected to the reference signal generation unit 413 via a resistor R3. A source of the FET1 is connected to the frame ground. The FET1 is turned ON or OFF in accordance with the light amount correction signal 411. The FET1 is pulled up by the resistor R3. The reference signal generation unit 413 is a low-pass filter formed of a resistor R2 and a capacitor C2. The reference signal generation unit 413 generates a direct-current voltage Vref (a correction reference signal 415) by smoothing the light amount control signal 410 input from the CPU 409, and outputs the direct-current voltage Vref to one end of the resistor R3. The light amount correction signal 411 is a low-active PWM signal. When the light amount correction signal 411 is high, the FET1 is turned ON, and low is input to the active filter 530. When the light amount correction signal 411 is low, the FET1 is turned OFF, and the correction reference signal 415 is input to the active filter 530. The amplitude of the signal input to the active filter 530 is the same as the amplitude of the correction reference signal 415. The logic of the signal input to the active filter 530 is the inverse of the logic of the light amount correction signal 411. Therefore, the signal input to the active filter 530 is also a PWM signal. The PWM signal input to the active filter 530 is smoothed and turns into a direct-current voltage, which is then input to a V-I conversion unit 531.

The V-I conversion unit 531 is composed of an operational amplifier OP2, a transistor Tr0, and a resistor R4. The V-I conversion unit 531 generates a correction current Ib corresponding to the input direct-current voltage. The correction current Ib flows in the resistor R4.

A current mirror circuit 533 is connected to the V-I conversion unit 531. The current mirror circuit 533 is composed of resistors R5 and R6, and transistors Tr1 and Tr2. The current mirror circuit 533 generates a correction current Ic that has the same current value as the correction current Ib. The correction current Ic flows in the resistor R1 via a diode D1.

The correction current Ic is generated through the above-described sequence of circuit operations. The current value of the correction current Ic is controlled by the correction reference signal 415 and the light amount correction signal 411.

During the image formation, the CPU 409 maintains the switch SW1 in an open state (OFF). The capacitor C1 is holding the voltage determined by the APC that was executed last. The voltage follower keeps outputting the output voltage that is equal to the input voltage; as a result, the current Iapc keeps flowing in the resistor R1.

When the correction current Ic flows in the resistor R1, the driving current 308 of the semiconductor laser 301 is reduced by a current corresponding to the correction current Ic. As a result, the current that flows in the resistor R1 is maintained at Iapc. As the driving current 308 is reduced, the light amount of the light emitted by the semiconductor laser 301 is reduced. That is to say, the CPU 409 can change the light amount of the semiconductor laser 301 by controlling the correction current Ic. In this way, the correction current generation unit 414 functions as a reduction circuit that reduces the driving current 308.

Out of a surface (an exposure surface) of a photosensitive drum D, an exposure surface corresponding to the adhesive area 211 may be referred to as an adhesive exposure area. When the adhesive exposure area is exposed to light of the laser beam J, the CPU 409 increases the laser beam J. Specifically, the CPU 409 increases the laser beam J by supplying a light amount increase signal 534 to a gate of an FET2. A drain of the FET2 is connected to an output terminal of the current mirror circuit 533. A source of the FET2 is connected to the frame ground. At a timing when the adhesive exposure area is exposed to light of the laser beam J, the FET2 is turned ON, and the correction current Ic flows to the frame ground. This stops the driving current 308 from being reduced due to the correction current Ic. That is to say, the driving current 308 apparently increases. In this way, the CPU 409 can increase the driving current 308 by disabling the function of the correction current generation unit 414 to reduce the driving current 308.

(3-5) Exposure Amount in Adhesive Area

Figure 6:
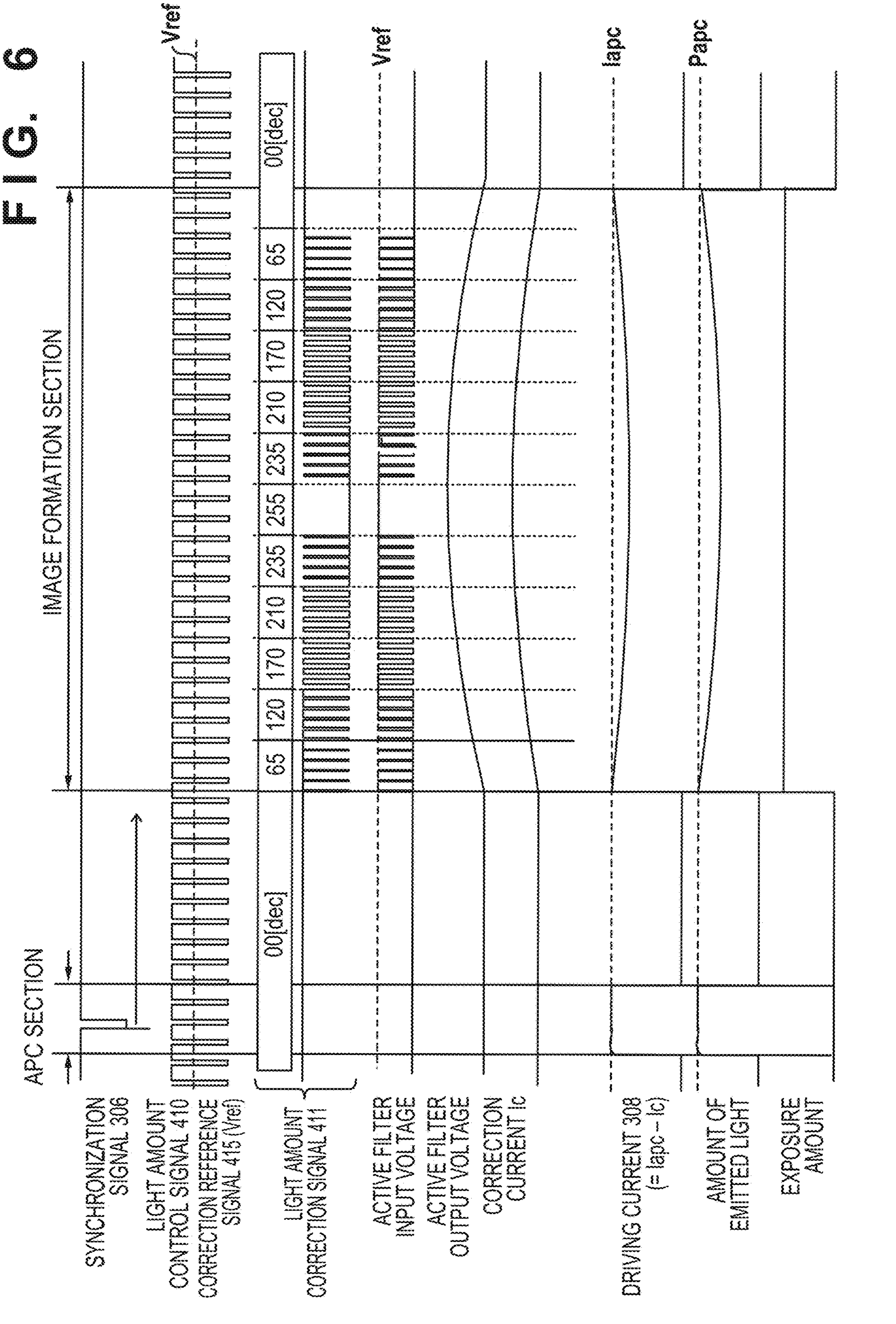
FIG. 6 is a diagram illustrating various types of signals, the amount of emitted light, and the exposure amount.

FIG. 6 shows light emission control for a case where an image corresponding to one line is formed. A horizontal axis represents the passage of time. A vertical axis represents the synchronization signal 306, the light amount control signal 410, the correction reference signal 415, the light amount correction signal 411, the input voltage to the active filter 530, and the output voltage from the active filter 530. Furthermore, the vertical axis also represents the correction current Ic, the driving current 308, the amount of light emitted by the semiconductor laser 301, and the exposure amount on a surface of a photosensitive drum D.

One scan period includes a non-image formation section and an image formation section. The non-image formation section is a section in which an image is not formed on the photosensitive drum D (a non-exposure section). The image formation section is a section in which an image is formed on the photosensitive drum D (an exposure section). An APC section is set as a part of the non-image formation section. The APC section is a section in which the APC is executed.

The CPU 409 determines a duty cycle of the light amount control signal 410 in accordance with a target light amount Papc, and outputs the light amount control signal 410. Furthermore, the CPU 409 adjusts the current Iapc by executing the APC control on a scan-by-scan basis so that the light amount of the semiconductor laser 301 is the same during every scan. Note that when the laser beam J is incident on the synchronization sensor 305 in the APC section, the synchronization sensor 305 outputs the synchronization signal 306. When a predetermined time period has elapsed since the timing of detection of the synchronization signal 306 (at the timing at which writing is started), the CPU 409 starts to output an image signal. Consequently, the semiconductor laser 301 starts to emit light, the surface of the photosensitive drum D is irradiated with the laser beam, and an electrostatic latent image is formed.

In conformity with the start of the image formation, the CPU 409 starts to output the light amount correction signal 411. A PWM signal corresponding to the correction reference signal 415 (direct-current voltage Vref) and the light amount correction signal 411 is input to the active filter 530. The correction current Ic corresponding to the output voltage generated by the active filter 530 is generated. The CPU 409 can change the light amount of the semiconductor laser 301 during one scan by changing the correction current Ic. In this way, the exposure amount becomes constant at every position on the photosensitive drum D in the main scanning direction. That is to say, the CPU 409 generates the light amount correction signal 411 so that the exposure amount becomes constant at every position on the photosensitive drum D in the main scanning direction.

(3-6) Thermocompression Bonding (Bonding Processing)

Figure 7:
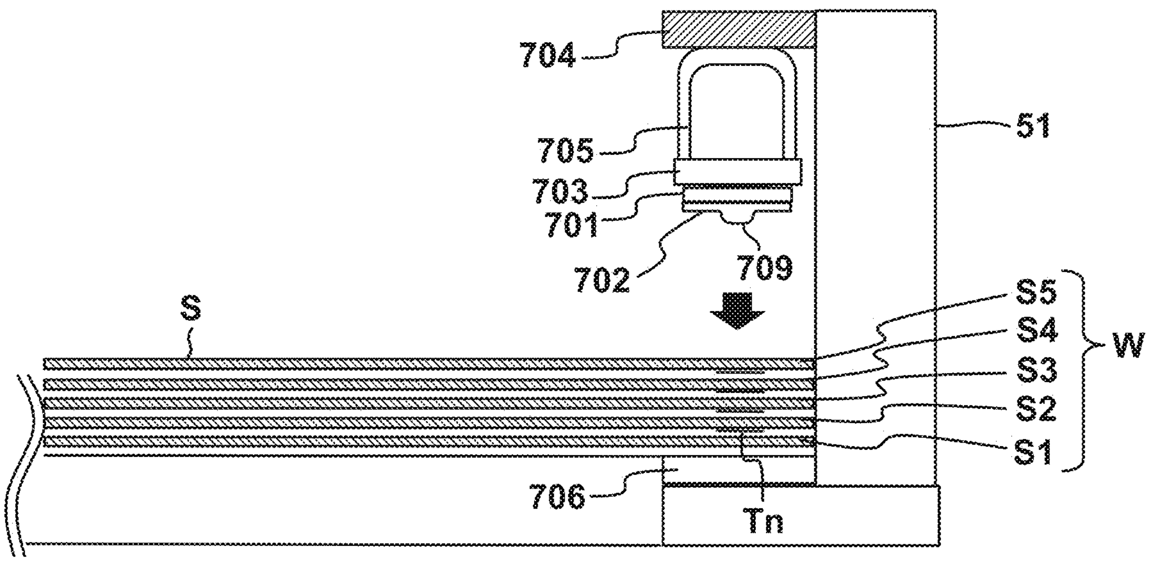
FIG. 7 is a diagram illustrating a thermocompression bonding unit.

As shown in FIG. 7, the thermocompression bonding unit 51 includes a heater 701, in which a heat generator as a heat source is embedded, and an aluminum heating plate 702 mounted thereon. The heater 701 is, for example, a ceramic heater. The temperature of the heater 701 may be measured by a temperature sensor, and controlled by a control circuit so that the measure temperature matches a target temperature. For example, the target temperature is set so that the surface temperature of a pressurizing portion 709 of the heating plate 702 is 200° C. By providing the heating plate 702 with the pressurizing portion 709, the heat and pressure of the thermocompression bonding unit 51 are concentrated on the binding position of a stack of sheets W. As a result, the efficiency of application of heat and pressure is improved.

The heater 701 is supported a heater support 703 made of resin. A pressurizing lever 704 applies pressure to the stack of sheets W by pushing down the thermocompression bonding unit 51 in a downward direction. The pressurizing force of the pressurizing lever 704 is transmitted to the pressurizing portion 709 via a metallic stay 705, which is a rigid body. The pressurizing force of the pressurizing lever 704 can be controlled in accordance with the amount of downward movement of the pressurizing lever 704. For example, the pressurizing force is 30 kgf.

A pressurizing plate 706 is formed of an elastic material (e.g., silicone rubber). This is because the pressurizing plate 706 is a member for stably catching the pressurizing force. The thermocompression bonding unit 51 applies pressure to the stack of sheets W, which is composed of sheets S1 to S5, and then becomes separated from the stack of sheets W.

The sheets S1 to S5 in FIG. 7 represent the first to the fifth sheets of a book as a deliverable. The sheet S1 is a cover of the book. Therefore, an adhesive toner image Tn is not formed on the sheet S1. The adhesive toner image Tn is formed on the lower surfaces of the sheets S2 to S5.

As shown in FIG. 7, the thermocompression bonding unit 51 is designed to apply heat and pressure to the right edges of the sheets S. For this reason, the adhesive area 211 is provided along the right edges of the sheets S, as shown in FIG. 2A and FIG. 2B. When a surface area of a photosensitive drum D corresponding to the adhesive area 211 is exposed to light of the laser beam J, the CPU 409 increases the laser beam J. As a result, a larger amount of toner is transferred to the adhesive area 211. That is to say, the adhesive force in the adhesive area 211 increases.

Specific operations in the adhesive area 211 are as follows. The CPU 409 outputs the light amount increase signal 534 (high level) that is in synchronization with the synchronization signal 306. That is to say, the CPU 409 outputs the light amount increase signal 534 after a predetermined time period has elapsed since the timing of input of the synchronization signal 306. The predetermined time period is a time period required from the timing at which the laser beam J passed through the synchronization sensor 305 to the timing at which the surface area of the photosensitive drum D corresponding to the adhesive area 211 is exposed to light.

When the light amount increase signal 534 becomes high, the FET2 is turned ON. As a result, the correction current Ic flows through the FET2, instead of flowing through the resistor R1. The light amount of the semiconductor laser 301 is controlled so that the current flowing through the resistor R1 becomes constant. As a result of the correction current Ic flowing through the FET2, the light amount of the semiconductor laser 301 increases. As shown in FIG. 2C, the exposure amount in the surface area of the photosensitive drum D corresponding to the adhesive area 211 increases.

(3-7) Relationship between Amount of Emitted Light and Exposure Amount

Figure 8:
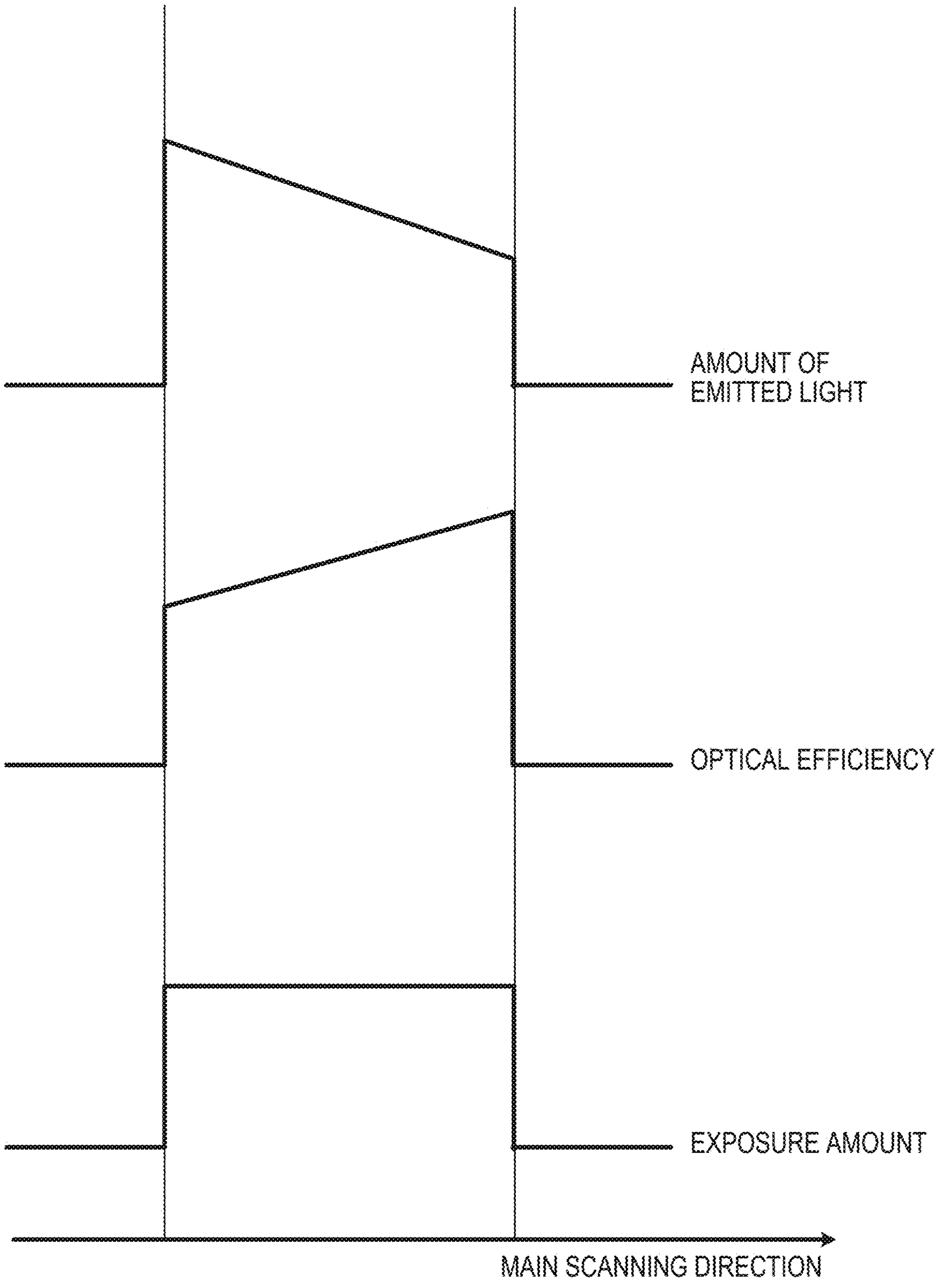
FIG. 8 is a diagram illustrating the amount of emitted light, the optical efficiency, and the exposure amount.

FIG. 8 shows a relationship among the amount of emitted light, the optical efficiency of the exposure apparatus 2, and the exposure amount on the surface of the photosensitive drum D in the main scanning direction. Here, the amount of emitted light is the light amount of the laser beam J at a light emission point of the semiconductor laser 301.

The optical system exists between the semiconductor laser 301 and the photosensitive drum D. Therefore, the laser beam J projected from the semiconductor laser 301 attenuates in the optical system. The amount of this attenuation varies in the main scanning direction. Here, the optical efficiency (propagation efficiency) is used as a measure of how easily the laser beam J is propagated.

The memory 420 stores an approximation formula that has been generated based on the premeasured optical efficiency. This approximation formula may be a function that takes a main scanning position as a variable. The CPU 409 reads out the approximation formula from the memory 420, and changes the light amount correction signal 411 in accordance with the approximation formula. As a result, the exposure amount has a predetermined value at every position in the main scanning direction (main scanning position).

According to FIG. 8, it is assumed that the optical efficiency is low on the side where writing is started in the main scanning direction, and the optical efficiency is high on the side where writing is ended. The inclination of the optical efficiency is constant. The memory 420 may hold an approximation formula for the inclination of the optical efficiency. The CPU 409 controls the amount of emitted light so that the exposure amount becomes constant.

According to FIG. 8, the amount of emitted light is large on the side where writing is started in the main scanning direction, and the amount of emitted light is small on the side where writing is ended in the main scanning direction. As a result, the exposure amount becomes constant at every main scanning position.

(3-8) Optical Efficiency and Inclination of Semiconductor Laser

The semiconductor laser 301 may be capable of outputting a plurality of beams. Outputting the plurality of beams simultaneously allows a plurality of main scanning lines to be rendered simultaneously. Alternatively, one appropriate beam may be selected from among the plurality of beams to correct a distortion of a main scanning line. It is presumed here that the semiconductor laser 301 can output two beams as an example.

Figure 9A:
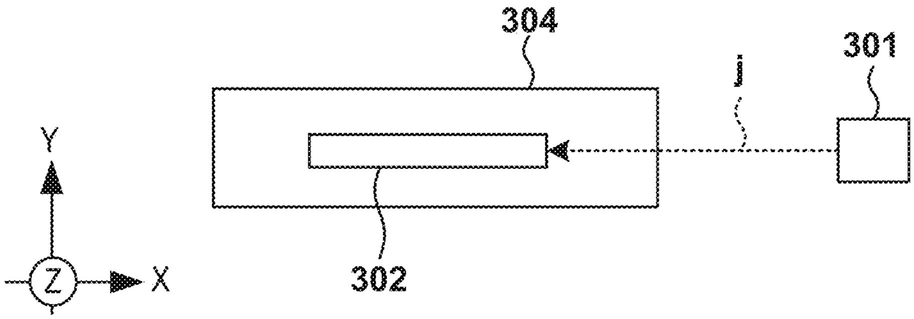
FIGS. 9A and 9B are diagrams illustrating the exposure apparatus.
Figure 9B:
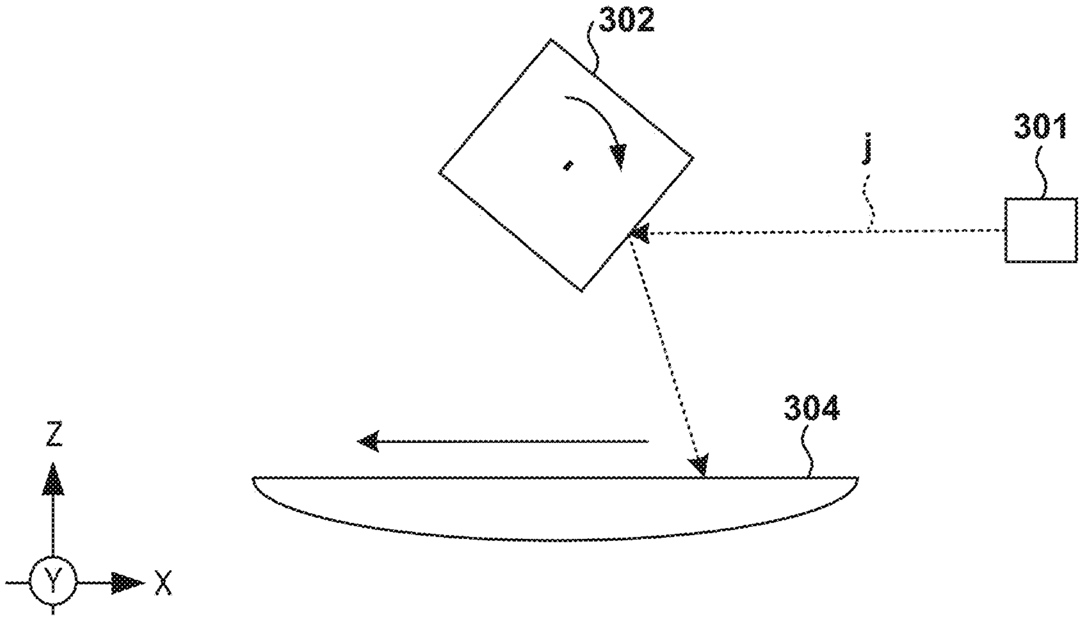
Figure 10:
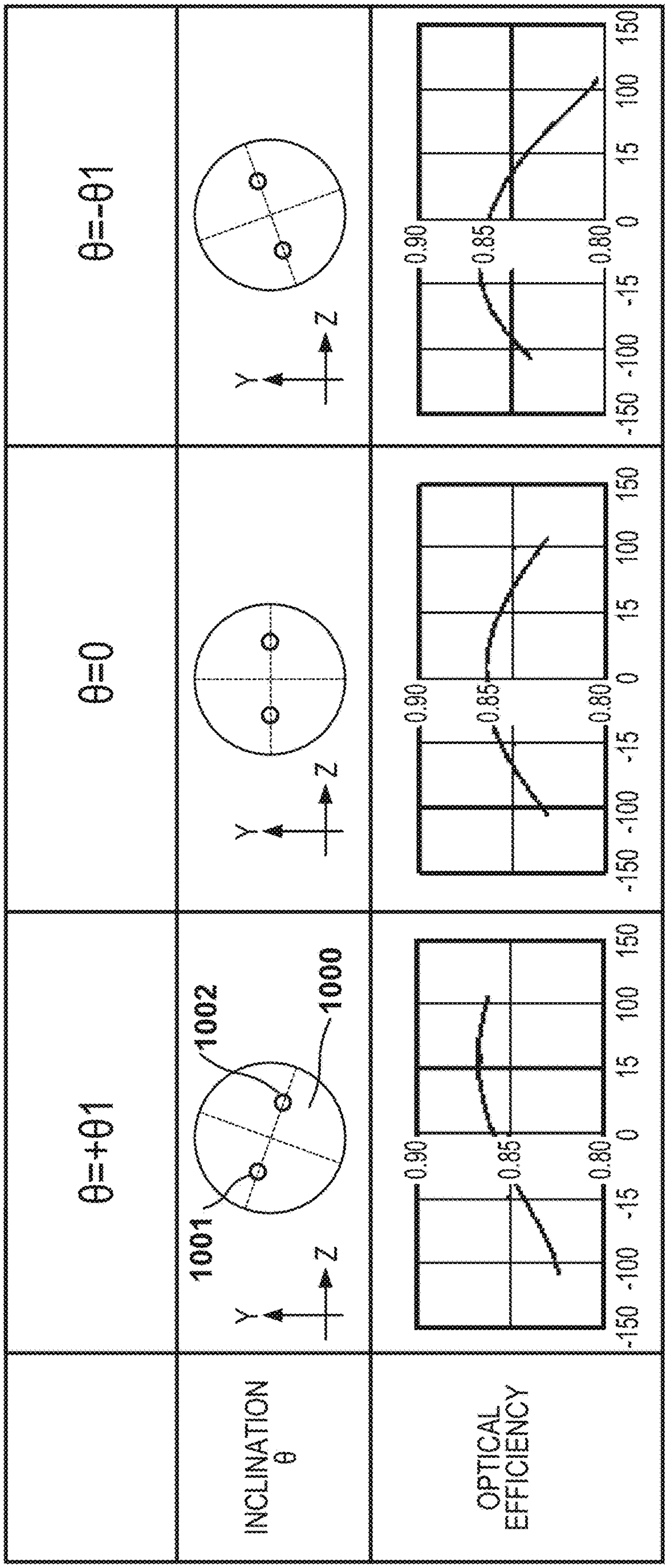
FIG. 10 is a diagram illustrating a relationship between the inclination of a semiconductor laser and the optical efficiency.

The optical efficiency is determined mainly by the rotation angle (inclination θ) of the semiconductor laser 301, the reflectance of the rotatable polygonal mirror 302, the reflectance of the reflection mirror 303, and the transmittance of the lens 304. FIG. 9A and FIG. 9B show a positional relationship among the semiconductor laser 301, the rotatable polygonal mirror 302, and the lens 304 for black toner. FIG. 9A shows the positional relationship on an X-Y plane. FIG. 9B shows the positional relationship on an X-Z plane. FIG. 10 shows a relationship between the inclination θ of the semiconductor laser 301 and the optical efficiency. In FIG. 10, the inclination θ is a rotation angle of a case where the semiconductor laser 301 has been rotated while using the direction of a normal to a projection surface 1000 of the semiconductor laser 301 as a rotation axis. A horizontal axis related to the optical efficiency represents an image height. On the horizontal axis, 0 is called the center of the image height. Light emission points 1001 and 1002 are arranged on the projection surface 1000. The light emission points 1001 and 1002 may be referred to as laser elements.

In a case where the inclination θ is θ1, two laser beams J output from the light emission points 1001 and 1002 form two main scanning lines at an interval of one dot on the exposure surface. One dot is an interval between the two main scanning lines when the resolution is set at 600 dpi. That is to say, the two main scanning lines can be rendered simultaneously by setting the inclination θ of the semiconductor laser 301 at +θ1 or −θ1. Note that when the inclination θ is 0, the two main scanning lines cannot be rendered simultaneously, but the peak of the optical efficiency is at the center of the image height.

Specifically, the semiconductor laser 301 is rotated so that an angle formed by the line connecting the two light emission points 1001 and 1002 and the Z-axis is +10 degrees or −10 degrees. As a result, the distance between the two main scanning lines rendered on a sheet S by the two laser beams J becomes one dot (resolution=600 dpi). Note that the CPU 409 may switch the resolution by rotating the semiconductor laser 301 using the motor 440. A high resolution of 1200 dpi, 2400 dpi, and so forth may be realized in this way.

Here, taking a look at the optical efficiency for the case where the inclination θ is +θ1, the optical efficiency is relatively low on the side where the image height is small (the side where writing is started in the main scanning direction). The optical efficiency is relatively high on the side where the image height is large (the side where writing is ended in the main scanning direction).

On the other hand, taking a look at the optical efficiency for the case where the inclination θ is −θ1, the optical efficiency is relatively high on the side where the image height is small (the side where writing is started in the main scanning direction). The optical efficiency is relatively low on the side where the image height is large (the side where writing is ended in the main scanning direction). In view of the above, it is understood that there is a correlation between the inclination θ of the semiconductor laser 301 and the image height (main scanning position) at which the optical efficiency peaks.

The optical efficiency of the optical system composed of the rotatable polygonal mirror 302, the reflection mirror 303, and the lens 304 is uniquely determined by optical coefficients (e.g., reflectance and transmittance). Therefore, the optical efficiency in the main scanning direction can be adjusted by setting the inclination θ of the semiconductor laser 301 at an optional value. For example, the optical efficiency can be set to be relatively high on the side where writing is started, or conversely, the optical efficiency can be set to be relatively low on the side where writing is ended.

(3-9) Relationship between Adhesive Area and Image Area

Figure 11B:
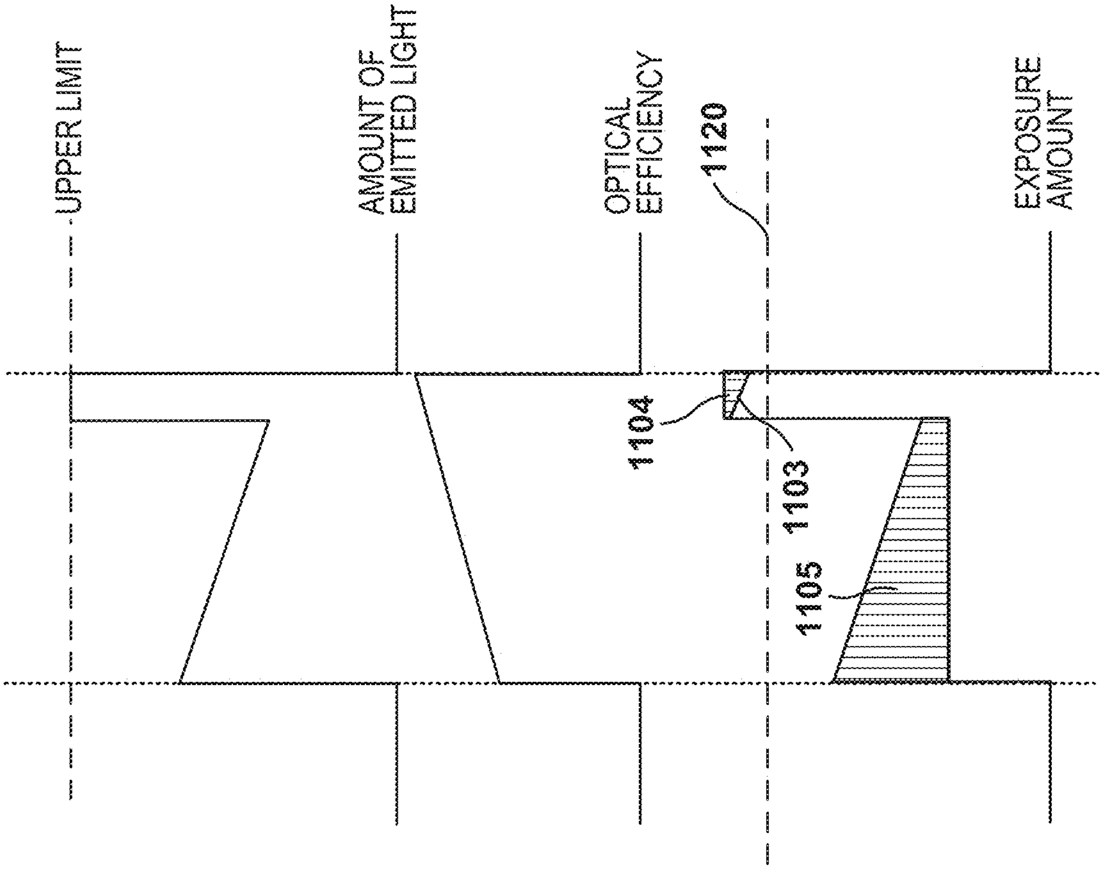
FIGS. 11A and 11B are diagrams illustrating a relationship between the inclination of the semiconductor laser and the exposure amount.
Figure 11A:
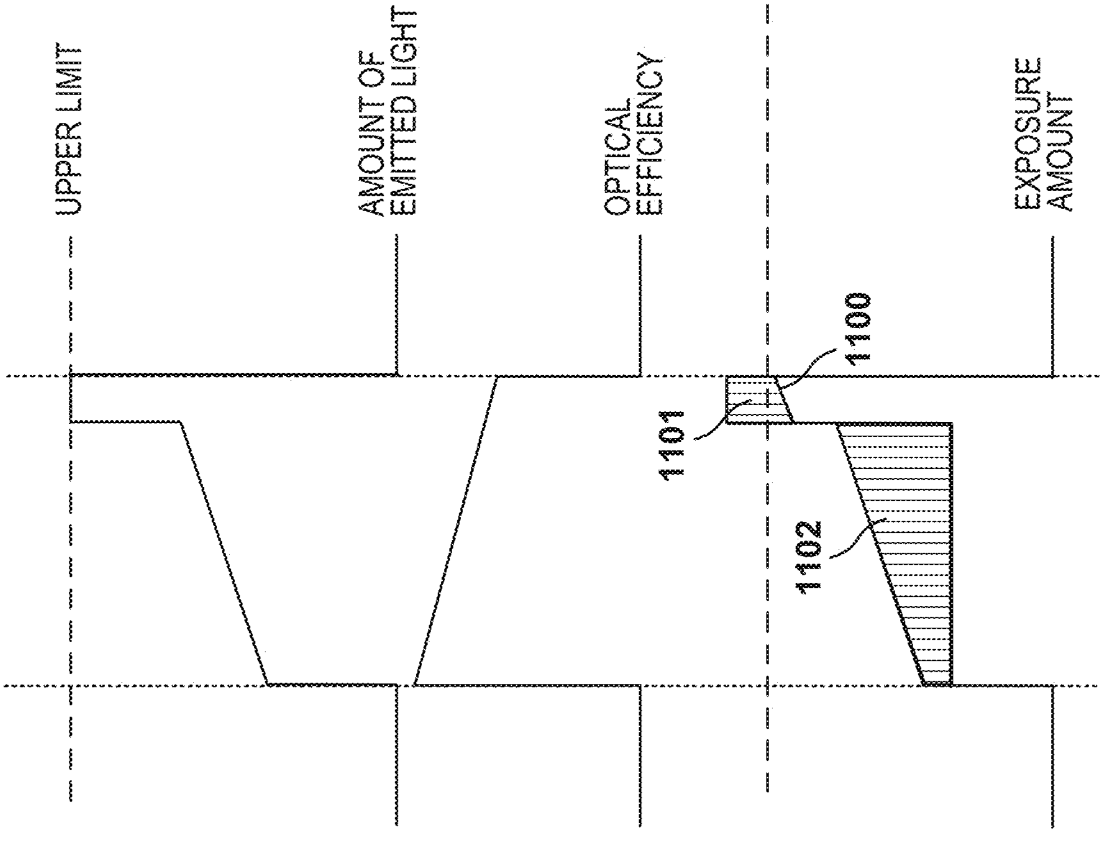

FIG. 11A and FIG. 11B show a relationship among the amount of emitted light, the optical efficiency, and the exposure amount. It is presumed here that the size of sheets S is A4. In order for the exposure amount to be a predetermined light amount at every position in the main scanning direction, the amount of emitted light is adjusted depending on the optical efficiency. That is to say, the amount of emitted light is increased at a main scanning position where the optical efficiency is low.

FIG. 11A shows a case where the optical efficiency is high on the side where writing is started in the main scanning direction. This is equivalent to a case where the inclination θ is −θ1. FIG. 11B shows a case where the optical efficiency is low on the side where writing is started in the main scanning direction. This is equivalent to a case where the inclination θ is +θ1. Hereinafter, the gradient of the optical efficiency relative to the main scanning direction will be described as a difference in the optical efficiency distribution between left and right. Furthermore, a state where the optical efficiency is relatively high on the side where writing is started will be described as a state where the optical efficiency distribution is large on the left side. On the other hand, a state where the optical efficiency is relatively high on the side where writing is ended will be described as a state where the optical efficiency distribution is large on the right side.

In FIG. 11A, an exposure amount 1100 denotes an exposure amount in the adhesive area 211. An exposure amount 1101 denotes an exposure amount in the adhesive area 211 that has been attenuated due to the optical efficiency (the amount of attenuation). An exposure amount 1102 denotes an exposure amount in the image area 212 that has been attenuated due to the optical efficiency (the amount of attenuation). In FIG. 11B, an exposure amount 1103 denotes an exposure amount in the adhesive area 211. An exposure amount 1104 denotes an exposure amount in the adhesive area 211 that has been attenuated due to the optical efficiency (the amount of attenuation). An exposure amount 1105 denotes an exposure amount in the image area 212 that has been attenuated due to the optical efficiency (the amount of attenuation). A required exposure amount 1120 shown in FIG. 11A and FIG. 11B denote an exposure amount that is required to achieve a sufficient adhesive force in the adhesive area 211. Therefore, in order to achieve a sufficient adhesive force, it is sufficient for the exposure amounts 1100 and 1103 in the adhesive area 211 to be larger than the required exposure amount 1120.

There is a rated value (an upper limit value) for the amount of light emitted by the semiconductor laser 301. This upper limit value is a value determined by a manufacturer of the semiconductor laser 301. Therefore, the amount of emitted light for the adhesive area 211 may be set at the upper limit value at most.

In the exemplary case shown in FIG. 11A, the exposure amount 1100 for the adhesive area 211 falls below the required exposure amount 1120. That is to say, with the inclination θ of the semiconductor laser 301 that makes the optical efficiency distribution large on the left side, the exposure amount for the adhesive area 211 would be insufficient, thereby causing the adhesive force to be insufficient.

In the exemplary case shown in FIG. 11B, the exposure amount 1103 for the adhesive area 211 exceeds the required exposure amount 1120. That is to say, with the inclination θ of the semiconductor laser 301 that makes the optical efficiency distribution large on the right side, the exposure amount for the adhesive area 211 would be sufficient, thereby achieving a sufficient adhesive force.

Therefore, the attenuated exposure amount 1104 is smaller than the exposure amount 1101, and the exposure amount 1103 is larger than the exposure amount 1100. As the exposure amount 1103 is larger than the required exposure amount 1120, a sufficient adhesive force is ensured in the adhesive area 211.

According to the present embodiment, in a case where the inclination θ is −θ1, the exposure amount in the adhesive area 211 becomes insufficient (FIG. 11A). Therefore, the inclination θ that increases the exposure amount in the adhesive area 211 (=+θ1) is adopted. As a result, the exposure amount in the adhesive area 211 increases, and the adhesive force in the adhesive area 211 is improved.

If possible, the peak of the optical efficiency distribution occurs at a main scanning position (adhesive exposure area) on the photosensitive drum D corresponding to the adhesive area 211. Alternatively, the peak of the optical efficiency distribution occurs between the center of the image height and the adhesive exposure area. This means that it is sufficient for the inclination θ to be closer to +θ1 than to −θ1.

Although the present embodiment adopts the semiconductor laser 301 that can output two laser beams J, this is merely an example. It is sufficient to adopt the exposure apparatus 2 with the optical efficiency that has a gradient in the main scanning direction, and the semiconductor laser 301 that can adjust the inclination θ. The number of laser beams J that can be output from the semiconductor laser 301 may be three or more.

Note that when the exposure apparatus 2 is shipped from a factory, the optical efficiency of the exposure apparatus 2 may be measured, and the inclination θ of the semiconductor laser 301 may be adjusted in accordance with the measured optical efficiency. In this case, an actuator (e.g., the motor 440) that causes the semiconductor laser 301 to rotate while using the direction of a normal to the projection surface 1000 of the laser beam J of the semiconductor laser 301 as a rotation axis would be unnecessary.

(3-10) Small-Sized Sheets

In the above description, it is presumed that the size of sheets S is A4. However, sheets S come in various sizes. In view of this, the following describes a method of setting the optical efficiency for a case where the adhesive area 211 is formed on small-sized sheets S (e.g., A5).

Figure 12A:
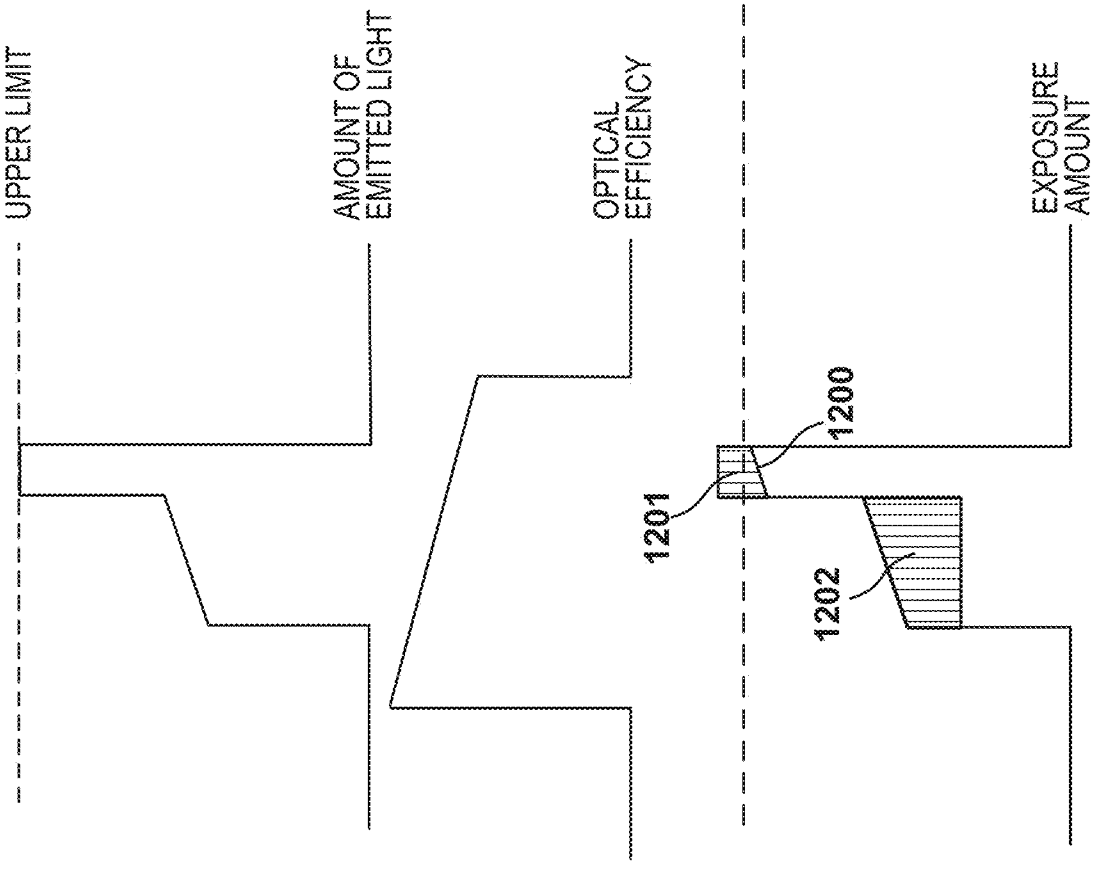
FIGS. 12A and 12B are diagrams illustrating a relationship between the inclination of the semiconductor laser and the exposure amount.
Figure 12B:
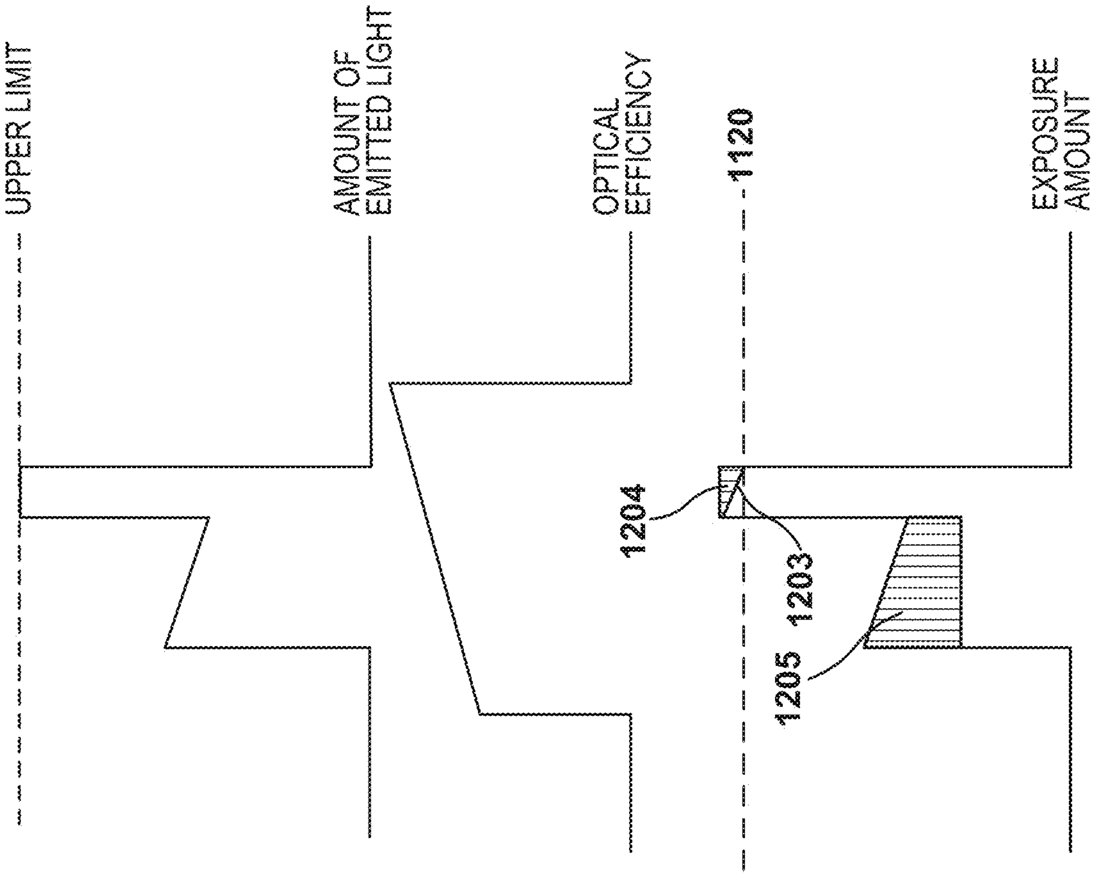

FIG. 12A and FIG. 12B show the amount of emitted light, the optical efficiency, and the exposure amount for a small-sized sheet S. A horizontal axis represents a main scanning position. Especially, in FIG. 12A, the optical efficiency is relatively high on the side where writing is started in the main scanning direction. This is equivalent to a case where the inclination θ is −θ1. In FIG. 12B, the optical efficiency is relatively high on the side where writing is ended in the main scanning direction. This is equivalent to a case where the inclination θ is +θ1.

In FIG. 12A, an exposure amount 1200 denotes an exposure amount in the adhesive area 211. An exposure amount 1201 denotes an exposure amount in the adhesive area 211 that has been attenuated due to the optical efficiency. An exposure amount 1202 denotes an exposure amount in the image area 212 that has been attenuated due to the optical efficiency. In FIG. 12B, an exposure amount 1203 denotes an exposure amount in the adhesive area 211. An exposure amount 1204 denotes an exposure amount in the adhesive area 211 that has been attenuated due to the optical efficiency. An exposure amount 1205 denotes an exposure amount in the image area 212 that has been attenuated due to the optical efficiency.

The adhesive force in the adhesive area 211 is improved by increasing the exposure amount of the laser beam J that scans a surface area corresponding to the adhesive area 211 on the photosensitive drum D on which an electrostatic latent image is formed. In the present example, the adhesive area 211 is arranged on the right side of the sheet S (the side where writing is ended). Therefore, the inclination θ that can increase the optical efficiency on the right side in the main scanning direction (=+θ1) is adopted. In this way, the peak of the optical efficiency distribution occurs between the center of the image (the center of the image height) and the adhesive exposure area. For example, the peak of the optical efficiency distribution may be closer to the adhesive exposure area than to the center of the image height. If possible, the peak of the optical efficiency distribution may occur in the adhesive exposure area. In this way, the image height at which the optical efficiency distribution peaks may be shifted from the center of the image height toward the adhesive exposure area.

The exposure amount 1203 shown in FIG. 12B is larger than the required exposure amount 1120. Therefore, a sufficient adhesive force is ensured in the adhesive area 211. However, compared to the adhesive area 211 on a large-sized sheet S, the adhesive area 211 on a small-sized sheet S is close to the center of the image. That is to say, the optical efficiency for the adhesive area 211 on a small-sized sheet S is lower than the optical efficiency for the adhesive area 211 on a large-sized sheet S. That is to say, the adhesive force in the adhesive area 211 on a small-sized sheet S is smaller than the adhesive force in the adhesive area 211 on a large-sized sheet S.

If the same adhesive force is required in the adhesive area 211 irrespective of the size of the sheet S, it is necessary to take other measures. For example, in a case where there is enough leeway between the exposure amount of the semiconductor laser 301 and the rated value, the CPU 409 may increase the target light amount of the semiconductor laser 301. That is to say, the CPU 409 determines a duty cycle of the light amount control signal 410 so as to increase the target light amount. In this way, the same adhesive force is ensured in the adhesive area 211 irrespective of the size of the sheet S.

As described above, the CPU 409 may change the target light amount in accordance with the size of a sheet S detected by the size sensor 430. For example, the target light amount for a small-sized sheet S is larger than the target light amount for a large-sized sheet S.

(3-11) Superimposition of Plurality of Toner Images

In the above-described embodiment, a toner image is formed in the adhesive area 211 using black toner. However, a toner image of toner in another color may be superimposed on the toner image of the black toner. The adhesive force in the adhesive area 211 may be increased in this way.

Figure 13:
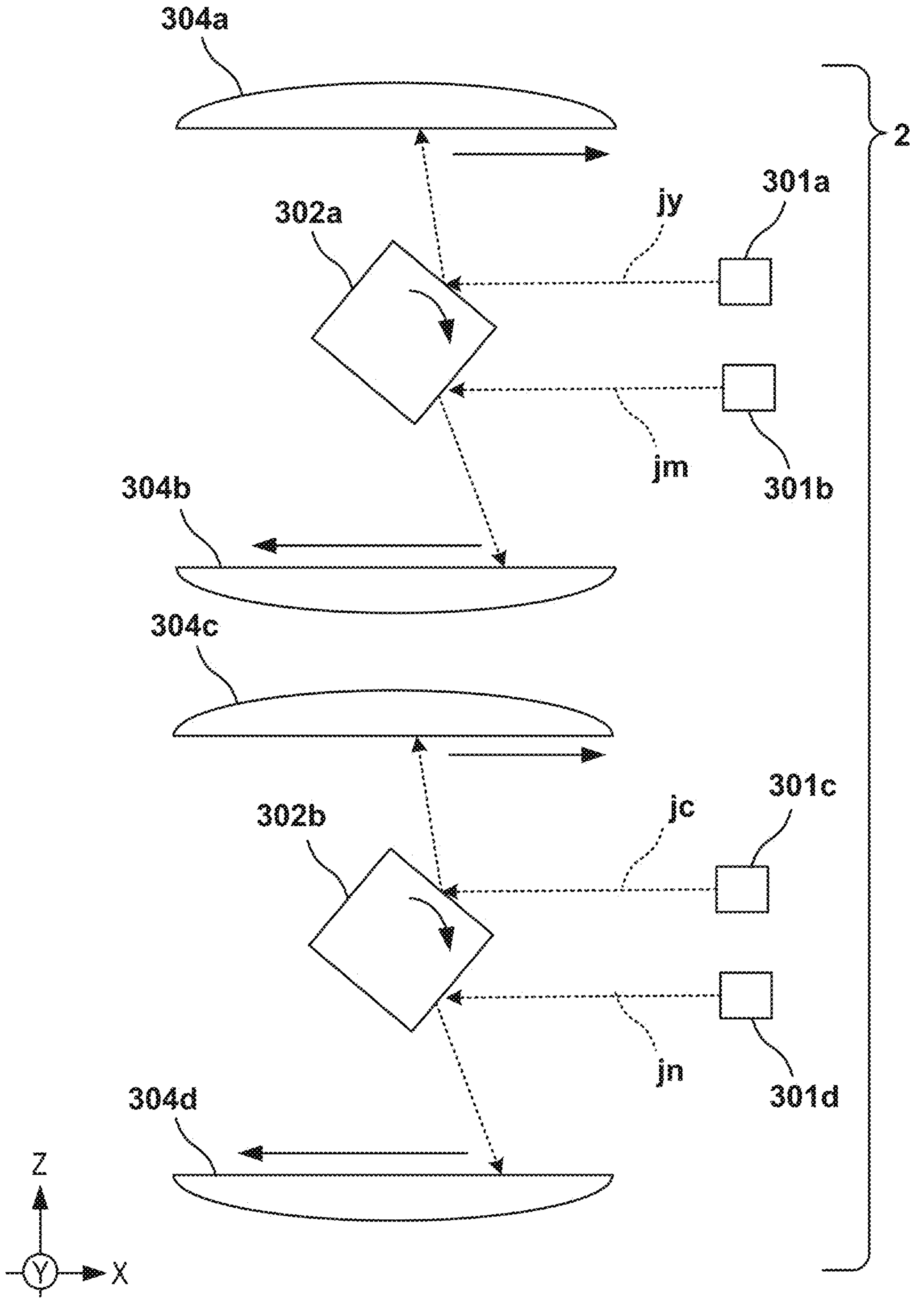
FIG. 13 is a diagram illustrating the exposure apparatus.

FIG. 13 shows the details of the exposure apparatus 2 according to the present embodiment. Here, the reflection mirrors 303 and the photosensitive drums D are omitted. A semiconductor laser 301*a* outputs a laser beam Jy for forming a yellow image. A semiconductor laser 301*b* outputs a laser beam Jm for forming a magenta image. A semiconductor laser 301*c* outputs a laser beam Jc for forming a cyan image. A semiconductor laser 301*d* outputs a laser beam Jn for forming a black image.

The laser beam Jy output from the semiconductor laser 301*a* is reflected by a rotatable polygonal mirror 302*a* that rotates, and is incident on a lens 304*a*. Noe that the scanning direction of the laser beam Jy is the +x direction. The laser beam Jm output from the semiconductor laser 301*b* is reflected by the rotatable polygonal mirror 302*a* that rotates, and is incident on a lens 304*b*. Noe that the scanning direction of the laser beam Jm is the −x direction.

The laser beam Jc output from the semiconductor laser 301*c* is reflected by a rotatable polygonal mirror 302*b* that rotates, and is incident on a lens 304*c*. Noe that the scanning direction of the laser beam Jc is the +x direction. The laser beam Jn output from the semiconductor laser 301*d* is reflected by the rotatable polygonal mirror 302*b* that rotates, and is incident on a lens 304*d*. Noe that the scanning direction of the laser beam Jn is the −x direction.

Below, it is assumed that toner images are formed in the adhesive area 211 with use of the black toner and the cyan toner. However, the magenta toner or the yellow toner may be used in place of the cyan toner. Alternatively, toner images may be superimposed on one another in the adhesive area 211 with use of three or four items of toner.

In the present embodiment also, the thermocompression bonding unit 51 is provided on the side where writing is ended in the main scanning direction of a sheet S. As shown in FIG. 2A, the adhesive area 211 is arranged on the right side of the sheet S. The difference in the optical efficiency distribution between left and right is determined mainly by the inclination θ of the semiconductor laser 301.

Incidentally, as shown in FIG. 13, the scanning direction of the laser beam J varies depending on the toner color. For example, the scanning direction in a yellow station is different from the scanning direction in a magenta station. Similarly, the scanning direction in a cyan station is different from the scanning direction in a black station. From a different point of view, the scanning direction in the yellow station is the same as the scanning direction in the cyan station. The scanning direction in the magenta station is the same as the scanning direction in the black station.

As has been described in the present embodiment, in order to increase the adhesive force in the adhesive area 211, it is sufficient that the peak of the optical efficiency distribution be on the right side in the main scanning direction. In a case where the black station and the cyan station have been selected for the adhesive area 211, it is sufficient that, in both of the black station and the cyan station, the peak of the optical efficiency distribution be on the right side in the main scanning direction. As the scanning direction in the black station is opposite to the scanning direction in the cyan station, the inclination θ of the semiconductor laser 301*c* is different from the inclination θ of the semiconductor laser 301*d*. For example, the inclination θc of the semiconductor laser 301*c* is set at −θ1, and the inclination Od of the semiconductor laser 301*d* is set at +θ1.

In this way, in both of the black station and the cyan station, the peak of the optical efficiency distribution occurs near a main scanning position that is equivalent to the adhesive area 211. That is to say, the adhesive force in the adhesive area 211 is improved.

The yellow station and the magenta station may form toner images in the adhesive area 211. In this case, in both of the yellow station and the magenta station, the peak of the optical efficiency distribution occurs near a main scanning position that is equivalent to the adhesive area 211.

(4) Flowchart

Figure 14:
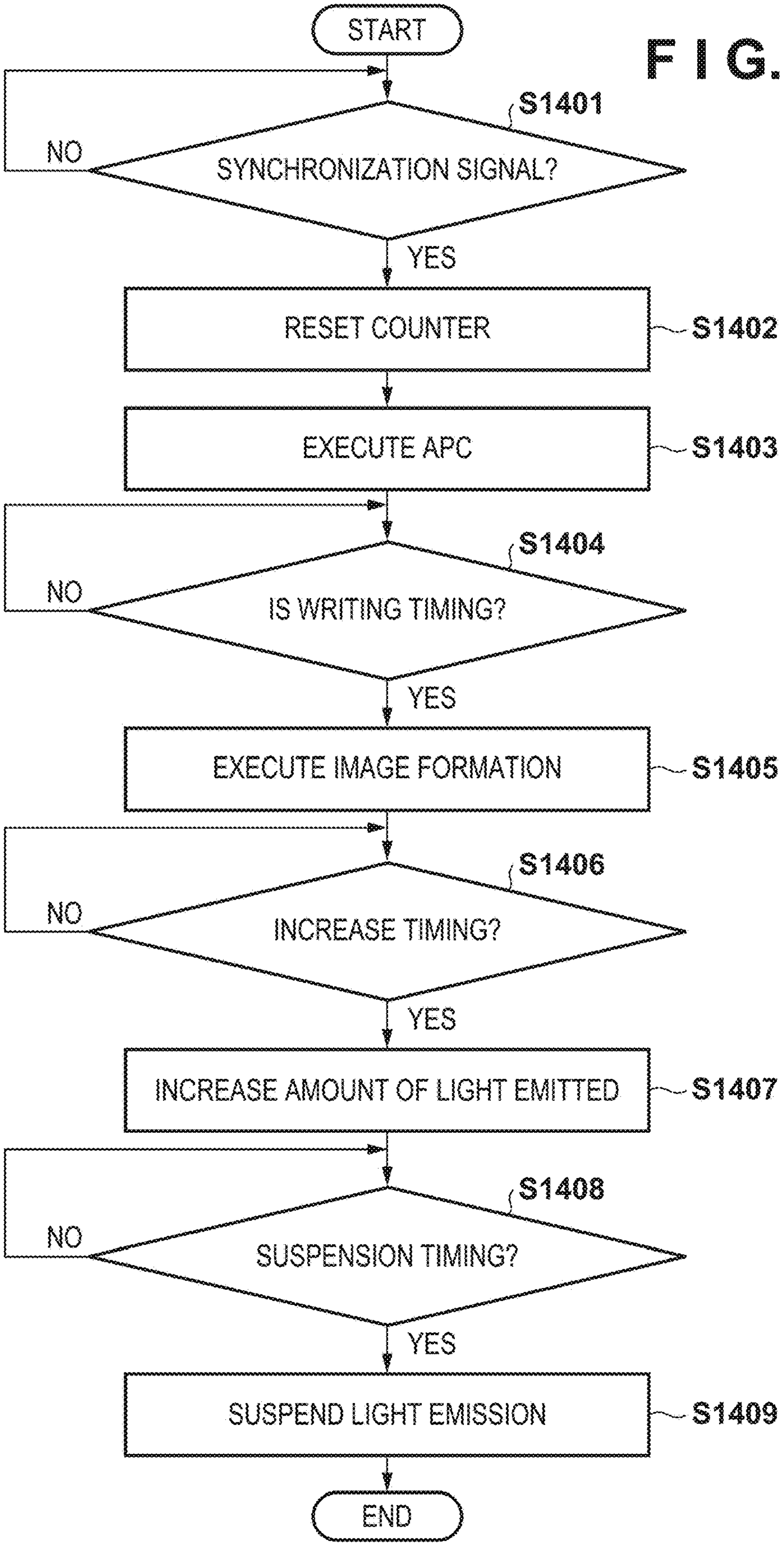
FIG. 14 is a flowchart showing a control method.

FIG. 14 shows a light amount control method that is executed by the CPU 409 in accordance with the control program. This light amount control method is processing that corresponds to one scan. Therefore, the light amount control method is executed repeatedly until a document image and an adhesive image are completed on one sheet S.

In step S1401, the CPU 409 determines whether the synchronization signal 306 has been input from the synchronization sensor 305. As such, the synchronization signal 306 acts as a trigger for one scan.

In step S1402, the CPU 409 resets a counter for recognizing a scanning position in the main scanning direction. This counter may be installed inside the CPU 409, or may be installed outside the CPU 409.

In step S1403, the CPU 409 executes the APC. Consequently, the value of the driving current that can achieve the target light amount is determined.

In step S1404, based on a count value of the counter, the CPU 409 determines whether the timing to start writing has arrived. Upon arrival of the timing to start writing, the CPU 409 causes processing to proceed from step S1404 to step S1405.

In step S1405, the CPU 409 executes image formation by causing the image signal generation unit 416 to start outputting an image signal. That is to say, outputting of the laser beam J that has been modulated based on the image signal is started. As a result, the document image is formed in the image area 212.

In step S1406, based on the count value of the counter, the CPU 409 determines whether the timing to increase the amount of light emitted by the semiconductor laser 301 has arrived. The arrival of the timing of the increase means that the irradiation position (exposure position) of the laser beam J has entered the adhesive area 211. Accordingly, the CPU 409 causes processing to proceed from step S1406 to step S1407.

In step S1407, the CPU 409 increases the amount of light emitted by the semiconductor laser 301. For example, the CPU 409 outputs the light amount increase signal 534 to the gate of the FET2. This turns the FET2 ON, and causes the correction current Ic to flow to the frame ground via the FET2. As a result, the driving current 308 increases to Iapc.

In step S1408, based on the count value of the counter, the CPU 409 determines whether the timing to suspend the semiconductor laser 301 has arrived. The timing of suspension refers to, for example, the timing at which the formation of the adhesive area 211 using the laser beam J is completed. Upon arrival of the timing of suspension, the CPU 409 causes processing to proceed from step S1408 to step S1409.

In step S1409, the CPU 409 suspends the light emission of the semiconductor laser 301. The suspension of the light emission may be realized by shifting the switch SW0.

(5) Technical Ideas Derived from Embodiment(s)

Item 1

The image area 212 is an example of the original area. As described above, the exposure amount for forming the second electrostatic latent image becomes larger than the exposure amount for forming the first electrostatic latent image. In this way, the adhesive force between sheets is improved.

Item 2

The semiconductor laser 301 is an example of the light emitting element. The rotatable polygonal mirror 302, the lens 304, and the reflection mirror 303 are examples of the optical system. As described above, a large amount of toner can be applied to the adhesive area 211 by bringing the exposure position at which the optical efficiency peaks close to the adhesive exposure area. As a result, the adhesive force between sheets is improved.

Item 3

The semiconductor laser 301 may include a plurality of light emission points 1001 and 1002 to render two main scanning lines simultaneously. In this case, there are two rotation angles that can achieve a certain resolution. Therefore, a rotation angle that allows a large amount of toner to be applied to the adhesive area 211 is selected. In this way, the adhesive force between sheets is improved.

Item 4

The motor 440 is an example of the rotation mechanism. The motor 440 may be provided to switch the resolution. It is permissible to select, with use of this motor 440, a rotation angle that allows a large amount of toner to be applied to the adhesive area 211 from among the two rotation angles that can achieve a certain resolution.

Item 5

The laser control unit 307 and the CPU 409 are examples of the controller.

Item 6

The driving current generation unit 412 is an example of the generation circuit that supplies the driving current to the light emitting element. The exposure amount may be increased by increasing the driving current. Consequently, the amount of toner applied to the adhesive area 211 is increased; the adhesive force may be improved in this way.

Item 7

The driving current generation unit 412 is an example of the generation circuit. The correction current generation unit 414 is an example of the correction circuit. As shown in FIG. 6 and FIG. 8, the correction current Ic is generated for each main scanning position so as to cancel out the property of the propagation efficiency. Note that in the adhesive exposure area, the driving current is relatively increased. In this way, the adhesive force between sheets is improved.

Item 8

In the second period, the light emitting element may output the light of an upper limit value or a rated value that has been determined for the light emitting element. In this way, the adhesive force between sheets may be improved by making the upmost use of the capability of the light emitting element.

Item 9

The CPU 409 and the driving current generation unit 412 are examples of the adjustment circuit. The correction current generation unit 414 is an example of the correction circuit. The CPU 409 and the FET2 are examples of a disabling circuit.

Item 10

The voltage source Vcc is an example of the power source. The correction current generation unit 414 is an example of the reduction circuit.

Item 11

As has been described in relation to FIG. 13, a toner image of the black toner and a toner image of the cyan toner are examples of the second toner image and the fourth toner image. In this way, the adhesive force between sheets may be improved by superimposing a plurality of toner images of different colors on one another in the adhesive area 211.

Item 12

As has been described in relation to FIG. 13, the exposure position (main scanning position) at which the propagation efficiency peaks may be adjusted in both of the black station and the cyan station.

Item 13

As has been described in relation to FIG. 13, the rotation angles of the semiconductor lasers 301*c* and 301*d* may be adjusted in both of the black station and the cyan station. The adhesive force between sheets may be improved in this way.

Item 14

As has been described in relation to FIG. 13, the scanning direction in the black station may be the exact opposite of the scanning direction in the cyan station. In this case, the rotation direction of the semiconductor laser 301*c* may be opposite to the rotation direction of the semiconductor laser 301*d*. The adhesive force between sheets may be improved in this way.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-084159, filed May 22, 2023 which is hereby incorporated by reference herein in its entirety.

What is claimed is:

1. A bookbinding apparatus comprising:

a photosensitive member;

a light source that forms a first electrostatic latent image corresponding to an original area and a second electrostatic latent image corresponding to an adhesive area by irradiating the photosensitive member with light;

a developing member that forms a first toner image and a second toner image by developing the first electrostatic latent image and the second electrostatic latent image using toner;

a transferring member that transfers the first toner image and the second toner image formed by the developing member to a sheet;

a fixing unit that fixes the first toner image and the second toner image on the sheet; and a bonding unit that creates a book by bonding a plurality of sheets on which the first toner image and the second toner image have been formed with use of the second toner image, wherein an irradiation amount of the light for forming the second electrostatic latent image is larger than an irradiation amount of the light for forming the first electrostatic latent image, wherein the light source includes a light emitting element, and an optical system that directs light output from the light emitting element to a surface of the photosensitive member, wherein, in a scanning direction of the light that is parallel to a rotation axis of the photosensitive member, the optical system has an image height defined as a position in the scanning direction within an image formation range extending from a writing start position to a writing end position of the light on the surface of the photosensitive member, the image height representing a coordinate along the scanning direction that increases from the writing start position toward the writing end position, wherein a peak position at which an optical efficiency of the optical system between the light emitting element and the surface of the photosensitive member peaks in the scanning direction is located between (i) a center position of the image height of the image formation range and (ii) a surface area on the photosensitive member in which the second electrostatic latent image is formed.

2. The bookbinding apparatus according to claim 1, wherein the light emitting element includes a projection surface on which at least two light emission points that are each capable of projecting an optical beam have been arranged, and wherein the peak position is located between the center position of the image height and the surface area on the photosensitive member in which the second electrostatic latent image is formed, as a result of causing the light emitting element to rotate while using a direction of a normal to the projection surface as a rotation axis.

3. The bookbinding apparatus according to claim 1, further comprising a rotation mechanism that causes the light emitting element to rotate such that the peak position is located between the center position of the image height and the surface area on the photosensitive member in which the second electrostatic latent image is formed.

4. The bookbinding apparatus according to claim 1, further comprising a controller that controls the light source, wherein the controller adjusts an area in which the second electrostatic latent image is formed on the surface of the photosensitive member in accordance with a size of the sheet.

5. The bookbinding apparatus according to claim 4, further comprising a generation circuit that supplies a driving current to the light emitting element, wherein the driving current supplied to the light emitting element during the light forming the second electrostatic latent image is larger than the driving current supplied to the light emitting element during the light forming the first electrostatic latent image.

6. The bookbinding apparatus according to claim 1, further comprising a generation circuit that supplies a driving current to the light emitting element; and a correction circuit that corrects the driving current in accordance with a scanning position of the light on the surface of the photosensitive member, wherein during a first period in which the light forms the first electrostatic latent image, the correction circuit corrects the driving current in accordance with a scanning position of the light so as to compensate for a variation in the optical efficiency in the scanning direction of the light that is parallel to the rotation axis of the photosensitive member, and the generation circuit generates the driving current such that the driving current supplied to the light emitting element during a second period in which the light forms the second electrostatic latent image is larger than the driving current supplied to the light emitting element during the first period.

7. The bookbinding apparatus according to claim 6, wherein during the second period, the light emitting element outputs the light of an upper limit value or a rated value that has been determined for the light emitting element.

8. The bookbinding apparatus according to claim 1, further comprising:

an adjustment circuit that adjusts an output amount of the light output from the light emitting element to a target light amount;

a correction circuit that corrects the output amount of the light output from the light emitting element in a case where the light irradiates an image forming area on the surface of the photosensitive member in accordance with an optical efficiency of the optical system; and a disabling circuit that, in a case where the light output from the light emitting element forms the second electrostatic latent image, disables the correction circuit so that the irradiation amount of the light for forming the second electrostatic latent image becomes larger than the irradiation amount of the light for forming the first electrostatic latent image.

9. The bookbinding apparatus according to claim 8, further comprising:

a power source that supplies a power source voltage to one end of the light emitting element;

a driving circuit that is included in the adjustment circuit, has one end connected to another end of the light emitting element, and generates a driving current supplied to the light emitting element;

a resistor that is included in the correction circuit and is connected between the driving circuit and a frame ground; and a reduction circuit that is included in the correction circuit and reduces the driving current, wherein the disabling circuit includes a switch element that inhibits an action of the reduction circuit to reduce the driving current.

10. A bookbinding apparatus comprising:

a first photosensitive member;

a first light source that forms a first electrostatic latent image corresponding to an original area and a second electrostatic latent image corresponding to an adhesive area by irradiating the first photosensitive member with light;

a first developing member that forms a first toner image and a second toner image by developing the first electrostatic latent image and the second electrostatic latent image using toner in a first color;

a first primary transferring member that transfers the first toner image and the second toner image formed by the first developing member to an intermediate transfer member;

a second photosensitive member;

a second light source that forms a third electrostatic latent image corresponding to the original area and a fourth electrostatic latent image corresponding to the adhesive area by irradiating the second photosensitive member with light;

a second developing member that forms a third toner image and a fourth toner image by developing the third electrostatic latent image and the fourth electrostatic latent image using toner in a second color;

a second primary transferring member that transfers the third toner image and the fourth toner image formed by the second developing member to the intermediate transfer member;

a secondary transferring member that transfers the first toner image, the second toner image, the third toner image, and the fourth toner image from the intermediate transfer member to a sheet;

a fixing unit that fixes the first toner image, the second toner image, the third toner image, and the fourth toner image to the sheet; and a bonding unit that creates a book by bonding a plurality of sheets on which the first toner image, the second toner image, the third toner image, and the fourth toner image have been formed with use of the second toner image and the fourth toner image, wherein an irradiation amount of the light for forming the second electrostatic latent image is larger than an irradiation amount of the light for forming the first electrostatic latent image, wherein the first light source includes a first light emitting element, and a first optical system that directs light output from the first light emitting element to a surface of the first photosensitive member, wherein, in a scanning direction of the light that is parallel to a rotation axis of the first photosensitive member, the first optical system has a first image height defined as a position in the scanning direction within a first image formation range extending from a writing start position to a writing end position of the light on the surface of the first photosensitive member, the first image height representing a coordinate along the scanning direction that increases from the writing start position toward the writing end position, wherein a first peak position at which an optical efficiency of the first optical system between the first light emitting element and the surface of the first photosensitive member peaks in the scanning direction is located between (i) a center position of the first image height of the first image formation range and (ii) a surface area on the first photosensitive member in which the second electrostatic latent image is formed, wherein the second light source includes a second light emitting element, and a second optical system that directs light output from the second light emitting element to a surface of the second photosensitive member, and wherein, in a scanning direction of the light that is parallel to a rotation axis of the second photosensitive member, the second optical system has a second image height defined as a position in the scanning direction within a second image formation range extending from a writing start position to a writing end position of the light on the surface of the second photosensitive member, the second image height representing a coordinate along the scanning direction that increases from the writing start position toward the writing end position, and wherein a second peak position at which an optical efficiency of the second optical system between the second light emitting element and the surface of the second photosensitive member peaks in the scanning direction is located between (i) a center position of the second image height of the second image formation range and (ii) a surface area on the second photosensitive member in which the fourth electrostatic latent image is formed.

11. The bookbinding apparatus according to claim 10, wherein the first optical system and the second optical system share a single rotatable polygonal mirror, the first light emitting element includes a first projection surface on which at least two light emission points that are each capable of projecting an optical beam have been arranged, wherein the second light emitting element includes a second projection surface on which at least two light emission points that are each capable of projecting an optical beam have been arranged, wherein the first peak position is located between the center position of the first image height and the surface area on the first photosensitive member in which the second electrostatic latent image is formed as a result of causing the first light emitting element to rotate while using a direction of a normal to the first projection surface as a rotation axis, and wherein the second peak position is located between the center position of the second image height and the surface area on the second photosensitive member in which the fourth electrostatic latent image is formed as a result of causing the second light emitting element to rotate while using a direction of a normal to the second projection surface as a rotation axis.

12. The bookbinding apparatus according to claim 11, wherein a rotation direction of the first light emitting element is opposite to a rotation direction of the second light emitting element.

* * * * *